United States Patent [19]
Tsukazoe et al.

[11] Patent Number: 5,812,551
[45] Date of Patent: Sep. 22, 1998

[54] ATM EXCHANGE WITH BAND CAMP-ON REGISTRATION FUNCTION

[75] Inventors: Atsushi Tsukazoe; Takashi Kato; Koichi Yoshida; Tomoko Yamashita, all of Fukuoka, Japan

[73] Assignee: Fujitsu Limited, Kanagawa, Japan

[21] Appl. No.: 619,404

[22] Filed: Mar. 21, 1996

[30]     Foreign Application Priority Data

Jul. 17, 1995    [JP]    Japan ................................. 7-179941

[51] Int. Cl.⁶ ................................................ H04L 12/28
[52] U.S. Cl. .......................................... 370/399; 379/209
[58] Field of Search ................................ 370/230, 235, 370/389, 392, 398, 399, 412, 426, 430, 443, 450, 463; 379/201, 209, 269, 289

[56]              References Cited

U.S. PATENT DOCUMENTS

| | | | |
|---|---|---|---|
| 3,937,892 | 2/1976 | Bloch et al. | 370/438 |
| 4,087,643 | 5/1978 | Joslow et al. | 370/212 |
| 5,268,957 | 12/1993 | Albrecht | 379/67 |
| 5,577,111 | 11/1996 | Iida et al. | 379/209 |

*Primary Examiner*—Hassan Kizou
*Assistant Examiner*—A. Bnmmoussa
*Attorney, Agent, or Firm*—Helfgott & Karas, P.C.

[57]              ABSTRACT

Disclosed is an ATM exchange for granting permission to a camp-on request in a short time.

A temporarily saved band value management table for managing temporarily saved band value is provided, as is a band management table for managing empty band value in the storage device of an ATM exchange comprising a storage device, a control device, and the like. The control device selects a corresponding empty band value for a temporarily saved band value when a first camp-on request is received from a terminal, and sets the empty band value to "0." In addition, the control device adds to the temporarily saved band value a band value released by a break in communication when a camp-on request is registered, and grants permission for communication to the terminal that has issued this camp-on request when the temporarily saved band value is higher than the band value required by a registered camp-on request. The control device determines whether or not a connection request can be accepted on the basis of the empty band value stored in the band management table.

12 Claims, 43 Drawing Sheets

ATM EXCHANGE WITH BAND CAMP-ON REGISTRATION FUNCTION

BACKGROUND OF THE INVENTION

1. Field of the Invention

The present invention relates to an ATM exchange used in an ATM communications system, and more particularly to an ATM exchange capable of performing camp-on registration.

2. Description of the Related Art

An ATM (Asynchronous Transfer Mode) communications system comprises a network in which a plurality of ATM exchanges are connected by transmission lines, and terminals connected to each ATM exchange.

In a common ATM communications system, a terminal notifies an ATM exchange of the desired band, quality, and other connection requirements when a call connection is requested. The ATM exchange investigates whether or not sources that satisfy these connection requirements can be found, performs the call connection when this can be offered, and notifies this terminal that the connection is denied when this cannot be offered. A terminal whose call request has been accepted performs communication, whereas a terminal that has been notified of a connection refusal repeats its requests for a call connection until it is accepted.

There are also ATM communications systems that use ATM exchanges capable of camp-on request registration. In such ATM communications systems, a terminal that has been notified of a connection refusal can issue a camp-on request, and the ATM exchange that has received the camp-on request monitors an empty band value and grants permission to communicate to the terminal that has issued the camp-on registration when the empty band value exceeds the band value required for the camp-on request.

The structure and operation of a conventional ATM exchange capable of performing camp-on registration will now be described in further detail with reference to FIG. 50.

As shown in the figure, a conventional ATM exchange 100 comprises a subscriber's line circuit 30, a switching unit 20, an output buffer 40, a control device 200, and a storage device 300 as its main constituent elements. The subscriber's line circuit 30 is a circuit for providing an interface with terminals T1 through Tn; the switching unit 20 identifies the addresses from the headers of the cells (fixed-length data that constitute a portion of the communications content) that have been inputted via the subscriber's line circuit 30, and presents the address to the output buffer 40. The output buffer 40 temporarily accumulates the cells and sends them out over a transmission line 50.

The control device 200 monitors the operating condition (empty band value #0) of the transmission line 50 and changes the empty band value #0 in accordance with the used or released band value when a call connection or disconnection occurs. The empty band value #0 and the required band value are compared with each other and connection receipt management is performed when a call connection has been requested. For example, the requested call is connected and the empty band value #0 is reduced by #Ti when a call connection requiring a band value #Ti (<#0) has been made from a terminal Ti. Meanwhile, a terminal Tj is notified of a refusal to connect when a call connection requiring a band value #Tj (>#0) has been made from the terminal Tj.

In addition, when a camp-on request have been issued from a terminal, the control device 200 registers the content thereof in the storage device 300. Every time a band value is released due to disrupted communication, it is determined whether or not the empty band value #0 exceeds the band value required for the registered camp-on request, and a call that corresponds to this camp-on request is established on the transmission line 50 when the empty band value #0 has exceeded the required band value.

As described above, in a conventional ATM exchange it is determined whether or not a connection request has been received based on the empty band value #0. The determination as to whether or not permission has been granted with respect to a camp-on request is also performed based on the empty band value #0. In a conventional ATM exchange, therefore, when a request is received for a call connection that uses a band below the empty band value after a camp-on request has been registered, a long time is often needed to finally establish a call in accordance with this connection request. For example, a long time is often needed before a camp-on request that requires a substantial band value is executed, as when television images are transmitted.

SUMMARY OF THE INVENTION

An object of the present invention is to provide an ATM exchange in which a permission for a camp-on request is issued in a short time.

The first ATM exchange pertaining to the present invention receives from terminals call connection requests and camp-on requests in which the band values being used are specified, and establishes on a transmission line calls for which the specified band values can be used, wherein this ATM exchange comprises a band value storage unit, a camp-on request storage unit, a connection request response unit, a camp-on request registration unit, a band value setting unit, a band value updating unit, a camp-on request response unit, and a post-processing unit.

The band value storage unit divides the unused band value of the transmission line into a empty band value and temporarily saved band value, and stores them. The camp-on request storage unit stores the contents of camp-on requests issued by each terminal, in correlation with the processing rank of these contents.

The connection request response unit establishes on the transmission line the call requested by a connection request when the connection request received from a terminal is one for which the use of a band value below the empty band value stored in the band value storage unit has been specified, and notifies the terminal of a refusal to connect when the connection request is such that the use of a band value exceeding the empty band value has been specified. In addition, the camp-on request registration unit, upon receipt of a camp-on request from a terminal, establishes the processing rank of this camp-on request and performs registration in the camp-on request storage unit in correlation with the processing rank that identifies the camp-on request data that represent the contents of this camp-on request. The band value setting unit adds the empty band value stored in the band value storage unit to the temporarily saved band values stored in the band value storage unit, and setting zero for the empty band value in the band value storage unit, when the registration of camp-on request data by the camp-on request registration unit is performed with respect to a camp-on request storage unit in which no camp-on request data have been registered.

The band value updating unit adds a band value released by a disconnected call to a temporarily saved band value stored in the band value storage unit when camp-on request data have been registered in the camp-on request storage unit upon detection of the disconnected call in the transmission line. In addition, the band value updating unit adds a band value released by a disconnected call to an empty band value stored in the band value storage unit when no camp-on request data have been registered in the camp-on request storage unit upon detection of a disconnected call in the transmission line.

The camp-on request response unit establishes a call that corresponds to camp-on request data in the transmission line when the temporarily saved band value stored in the band value storage unit exceeds the band value specified for use by the camp-on request data that are stored in the camp-on request storage unit and that are assigned the highest processing rank. The post-processing unit reduces the temporarily saved band value stored in the band value storage unit by the band value used to set up a call when it is set up by the camp-on request response unit, and erases the camp-on request data that is stored in the camp-on request storage unit and that have been used by the camp-on request response unit.

Specifically, in the first ATM exchange of the present invention, band value not used for communication are monitored and divided into the empty band value used to determine whether or not a connection request has been received, and the temporarily saved band value used to determine whether or not there has been a response to a camp-on request, and the band values that have been released following receipt of a camp-on request are all used for camp-on requests. A terminal connected to the first ATM exchange can therefore start communication soon after a camp-on request has been issued.

The camp-on request registration unit adopted for use in the first ATM exchange of the present invention may be a unit for assigning to camp-on request data a processing rank indicating that a processing sequence is to be conducted following the processing of the camp-on request data registered in the camp-on request data storage unit when the camp-on request data are registered for a newly received camp-on request.

In addition, a second ATM exchange can be obtained by further providing the first ATM exchange with a class storage unit for storing classes assigned to different terminals. The addition of a class storage unit, however, leads to the use of a camp-on request registration unit for changing the processing rank of each piece of the camp-on request data in the camp-on request storage unit in such a way that the camp-on request data are processed in accordance with a sequence that corresponds to the classes assigned to terminals and stored in the class storage unit when camp-on request data concerning camp-on requests newly received from the terminals are registered in the camp-on request storage unit.

Setting up a communications system in which a second ATM exchange thus configured is used allows camp-on requests to be processed in accordance with the priority ranks that correspond to the classes of terminals, making it possible to conduct effective communication.

It is also possible to further provide the first ATM exchange of the present invention with a time-specific class storage unit for storing classes related to different terminals for each time period, and to adopt as a camp-on request registration unit a unit for changing the processing rank of each piece of the camp-on request data in the camp-on request storage unit in such a way that the camp-on request data are processed in accordance with a sequence that corresponds to the classes assigned to terminals at the present moment and stored in the class storage unit when camp-on request data concerning camp-on requests newly received from the terminals are registered in the camp-on request storage unit.

The second ATM exchange of the present invention can be further provided with a second class storage unit for storing a second type of class data and waiting time data concerning each terminal; a selection unit for selecting, from among the camp-on request data stored in the camp-on request storage unit, camp-on request data in which the time that has elapsed following registration exceeds the waiting time data stored in the second class storage unit for a terminal that has issued a camp-on request; and a second processing rank change unit for changing the processing rank of each peace of the camp-on request data stored in the camp-on request storage unit in such a way that the camp-on request data selected by the selection unit are processed in accordance with an order that corresponds to the second class stored in the second class storage unit for the terminal that has issued this camp-on request.

An allocated band value storage unit for storing interrelations between terminals and allocated band values can also be added to the first ATM exchange of the present invention. The connection request response unit used in this case may be a unit for issuing a refusal to connect when a band value is higher than the allocated band value stored in the allocated band value storage unit for a terminal, even in cases in which a connection request that requires the use of a band value below the empty band value in the band value storage unit has been received from the terminal. In addition, the camp-on request registration unit used may be a unit for issuing a refusal to register a camp-on request from a terminal when the band value specified for use with the camp-on request received from the terminal is higher than the allocated band value stored in the allocated band value storage unit for this terminal.

The second ATM exchange of the present invention can be further provided with a class-specific allocated band value storage unit fir storing interrelations between classes and allocated band values. The connection request response unit used in this case may be a unit for issuing a refusal to connect when a band value is higher than the allocated band value stored in the class-specific allocated band value storage unit for the class of a terminal, even in cases in which a connection request that requires the use of a band value below the empty band value in the band value storage unit has been received from the terminal. In addition, the camp-on request registration unit used may be a unit for issuing a refusal to register a camp-on request from a terminal when the band value specified for use with the camp-on request received from the terminal is higher than the allocated band value stored in the class-specific allocated band value storage unit for this terminal.

A secured empty band value storage unit for storing interrelations between terminals and secured empty band values can also be added to the first ATM exchange of the present invention. The connection request response unit used in this case may be a unit for establishing a requested call on the transmission line only in those cases in which the value stored in the band value storage unit when a call connection has been requested by a terminal is the empty band value that exceed the value obtained by adding the requested band value and the secured empty band value stored in the secured empty band value unit for this terminal. In addition, the camp-on request registration unit used is a unit for adding the secured empty band value stored in the secured empty band value unit for the terminal that has issued a camp-on request to the temporarily saved band value in the band value storage unit, and for subtracting this secured empty band value from the empty band value in the band value storage unit, when a camp-on request has been received in the absence of an object of monitoring (camp-on request).

A class-specific secured empty band value storage unit for storing interrelations between classes and secured empty band values can also be added to the second ATM exchange of the present invention. The connection request response unit used in this case may be a unit for establishing the requested call on a transmission line only in those cases in which the value stored in the band value storage unit when a call connection has been requested by a terminal is the empty band values that exceed the values obtained by adding the requested band value and the secured empty band value stored in the class-specific secured empty band value unit for this terminal. In addition, the camp-on request registration unit used is a unit for adding the secured empty band value stored in the class-specific secured empty band value unit for the terminal that has issued a camp-on request to the temporarily saved band value in the band value storage unit, and for subtracting this secured empty band value from the empty band value in the band value storage unit, when a camp-on request is received in the absence of a monitoring object.

A caller-specific class storage unit for storing the interrelations between classes and caller identification information can also be added to the first ATM exchange of the present invention. The unit used as the camp-on request registration unit in this case is a unit for changing the processing rank of each peace of the camp-on request data in the camp-on request storage unit in such a way that the received camp-on request is processed in accordance with a sequence that corresponds to the class stored in the caller-specific class storage unit in correlation with the identification information contained in this camp-on request.

In addition, the unit used as the connection request response unit should be a unit for providing information about the number of pieces of the camp-on request data registered in the camp-on request storage unit when a terminal has been given a message that a connection has been refused.

A third ATM exchange of the present invention receives terminal-originated requests for call connections for which the band value to be used are specified, and establishes a call in which the specified band value can be utilized in a transmission line, wherein this ATM exchange comprises a band value storage unit, a camp-on request storage unit, a connection request processing unit, a band value setting unit, a band value updating unit, a camp-on request response unit, and a post-processing unit.

The band value storage unit is used to divide the unused band value of a transmission line into an empty band value and a temporarily saved band values, and to store them. The camp-on request storage unit is used to store the contents of camp-on requests in correlation with the processing ranks thereof.

The connection request processing unit establishes on a transmission line a call requested by a connection request when the connection request received from a terminal is one for which the use of a band value below the empty band value stored in the band value storage unit has been specified. In addition, the connection request processing unit considers a connection request to be a camp-on request when the processing rank received from a terminal is one for which the use of a band value above the empty band value stored in the band value storage unit has been specified, establishes the processing rank of this camp-on request, and performs registration in the camp-on request storage unit in correlation with the processing rank that identifies the camp-on request data that represent the contents of this camp-on request.

The band value setting unit adds the empty band value stored in the band value storage unit to the temporarily saved band value stored in the band value storage unit, and setting zero for the empty band values in the band value storage unit, when the registration of camp-on request data by the camp-on request processing unit is performed with respect to a camp-on request storage unit in which no camp-on request data have been registered.

The band value updating unit adds a band value released by a disconnected call to a temporarily saved band value stored in the band value storage unit when camp-on request data have been registered in the camp-on request storage unit upon detection of a disconnected call in the transmission line. In addition, the band value updating unit adds a band value released by a disconnected call to an empty band value stored in the band value storage unit when no camp-on request data have been registered in the camp-on request storage unit upon detection of a disconnected call in the transmission line.

The camp-on request response unit establishes a call that corresponds to camp-on request data in the transmission line when the temporarily saved band value stored in the band value storage unit exceeds the band value specified for use by the camp-on request data that are stored in the camp-on request storage unit and that are assigned the highest processing rank. The post-processing unit reduces the temporarily saved band value stored in the band value storage unit by the band value used to set up a call when it is set up by the camp-on request response unit, and erases the camp-on request data that is stored in the camp-on request storage unit and that have been used by the camp-on request response unit.

Specifically, when a connection request cannot be received, the third ATM exchange considers this connection request to be a camp-on request and registers it.

DETAILED DESCRIPTION OF THE PREFERRED EMBODIMENTS

The present invention will now be described in detail with reference to drawings.

First Embodiment

Figure 1:
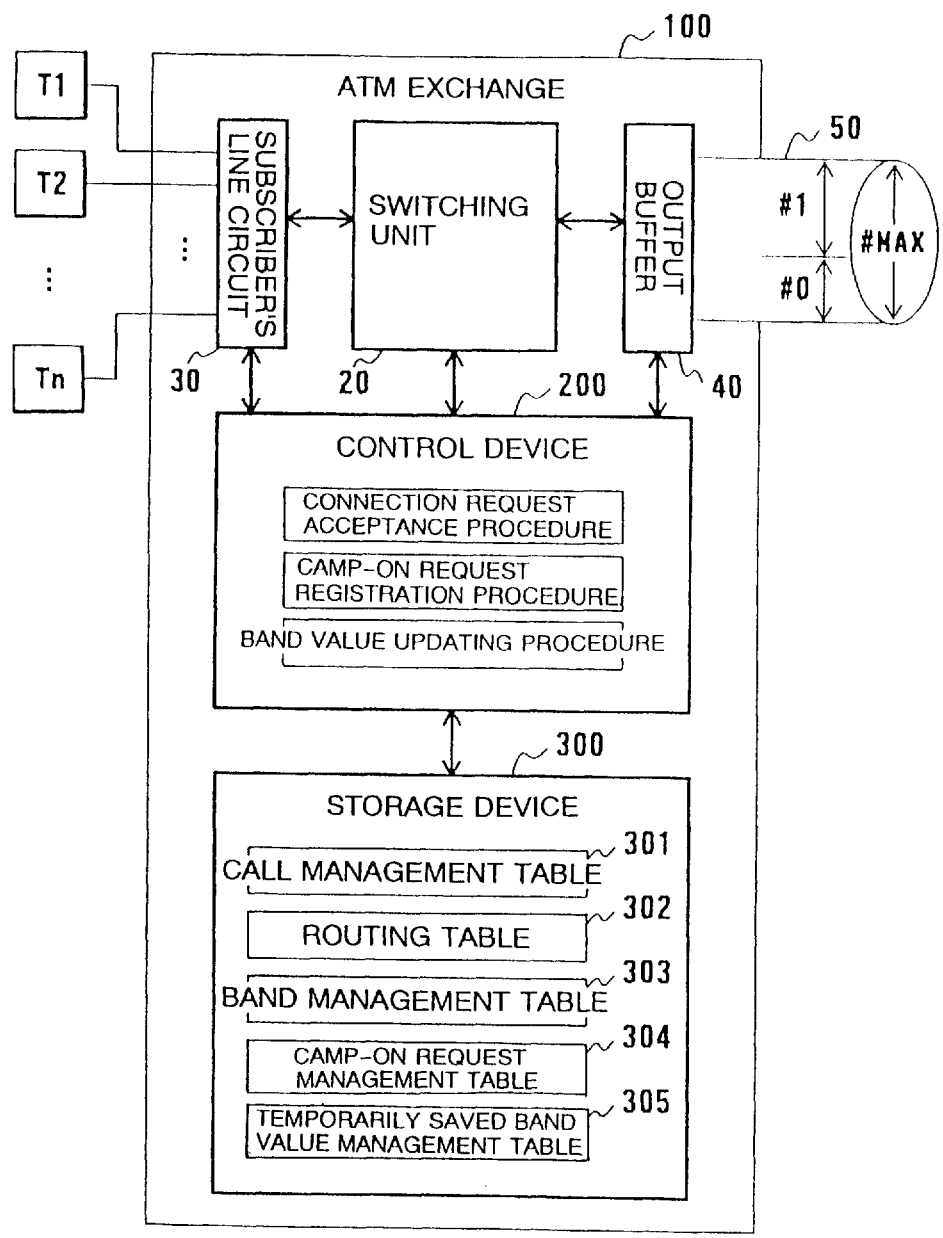
FIG. 1 is a block diagram depicting the structure of an ATM exchange pertaining to a first embodiment of the present invention.
Figure 2:
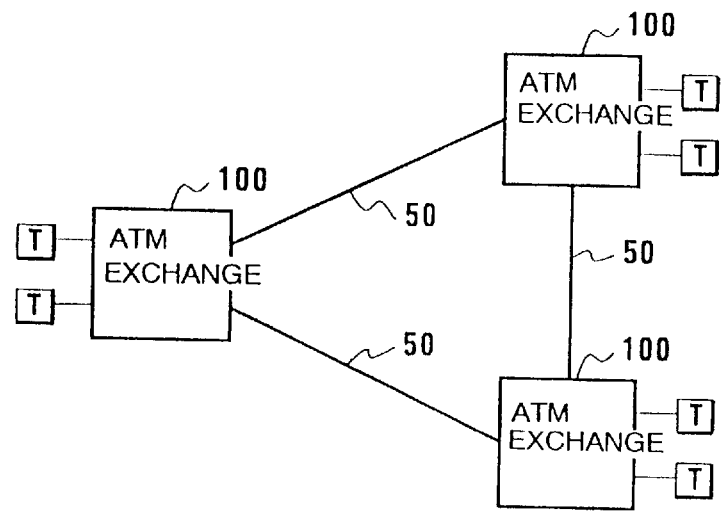
FIG. 2 is a diagram depicting an example of a communications system formed by the ATM exchanges of the present invention.

FIG. 1 depicts a schematic structure of the ATM exchange pertaining to the first embodiment of the present invention. As shown in the figure, the ATM exchange 100 of the first embodiment comprises a switching unit 20, a subscriber's line circuit 30, an output buffer 40, a control device 200, and a storage device 300 as its main constituent elements. The subscriber's line circuit 30 is connected to terminals T1 through Tn, and the output buffer 40 is connected to a transmission line 50. Although only one output buffer 40 is shown in the figure, an actual ATM exchange 100 is provided with a plurality of output buffers, and, as schematically shown in FIG. 2, a plurality of ATM exchanges 100 can be connected by a plurality of transmission lines 50, forming a communications system.

The subscriber's line circuit 30 controls the timing of cell transmission for each terminal. The switching unit identifies cell addresses based on the headers of the cells inputted via the subscriber's line circuit 30, and presents these cells to the output buffer 40 in accordance with their addresses. The output buffer 40 temporarily accumulates cells received from a plurality of terminals and sequentially sends out these cells over the transmission line 50.

The storage device 300 is based on semiconductor memory, and it stores data concerning the operating state or connection environment of the ATM exchange 100. A call management table 301, a routing table 302, a band management table 303, a camp-on request management table 304, and a temporarily saved band value management table 305 are accommodated in the storage device 300.

The control device 200 is based on a processor and executes a connection request acceptance procedure, a camp-on request registration procedure, and a band value updating procedure.

Each procedure will now be described in order.

<Connection Request Acceptance Procedure>

During the connection request acceptance procedure, it is determined whether or not a terminal-originated connection request for a call can be accepted. When a connection request for a call has been received from a terminal, the control device 200 executes the connection request acceptance procedure by accessing or updating the contents of the call management table 301, the routing table 302, and the band management table 303. The structures of these tables will be described before the details of the connection request acceptance procedure are elucidated.

Figure 3:
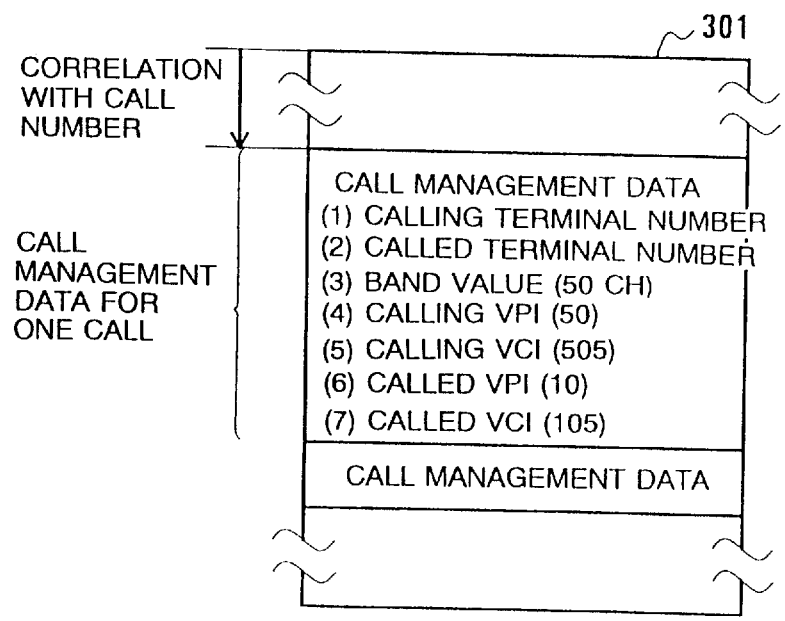
FIG. 3 is a block diagram depicting a call management table accommodated in the ATM exchange of the first embodiment.

FIG. 3 depicts the structure of the call management table 301. The call management table 301 comprises a plurality of storage areas, each of which stores call management data consisting of a calling terminal number, a called terminal number, a band value, a calling VPI, a calling VCI, a called VPI, and a called VCI.

Figure 4:
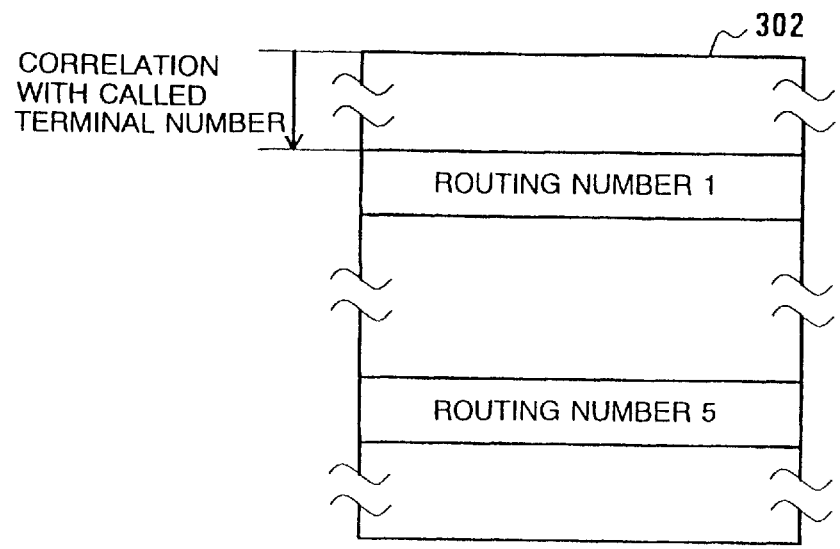
FIG. 4 is a block diagram of a band management table accommodated in the ATM exchange of the first embodiment.

FIG. 4 depicts the structure of the routing table 302. The routing table 302 is a table that contains interrelations between called terminals and the routes used to establish communication with these called terminals. As shown in the figure, the storage area whose position corresponds to the called terminal number in the routing table 302 stores the route number of the route used to establish communication with the terminal that has this called terminal number.

Figure 5:
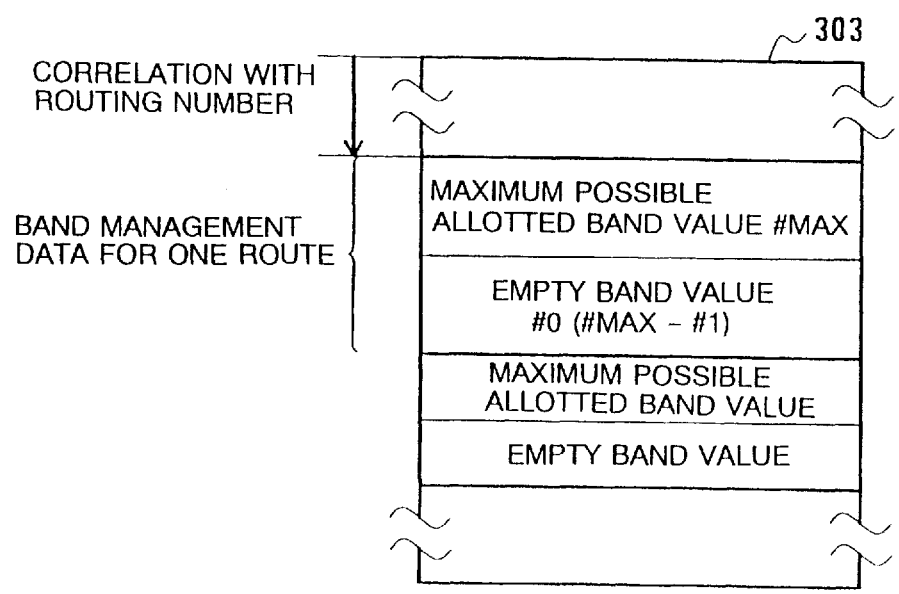
FIG. 5 is a block diagram of a routing table accommodated in the ATM exchange of the first embodiment.

FIG. 5 depicts the structure of the band management table 303. The band management table 303 is provided with storage areas for storing the maximum possible allotted band value #MAX for each route and the empty band value #0 (#MAX—combined use band value #1), and data concerning the route of a route number K are stored in a storage area whose position corresponds to the route number K.

In the connection request acceptance procedure, these tables are used in accordance with the following sequence.

When a connection request for a call is received from a terminal, the control device 200 assigns a call number to this call and writes information (called terminal number) about the party to be connected and call management data that include the required band value in the storage area whose position corresponds to the call number in the call management table 301. The route number of the route used for this call is subsequently obtained by reading the contents of the storage area whose position corresponds to the called terminal number in the routing table 302.

The control device 200 then obtains the empty band value of the intended route by reading the contents of the storage area whose position corresponds to the obtained route number in the band management table 303. It is then determined whether or not there is acceptance of a connection request by comparing the magnitude of the empty band value thus obtained and the magnitude of the band value (required band value) in the call management table.

Figure 6:
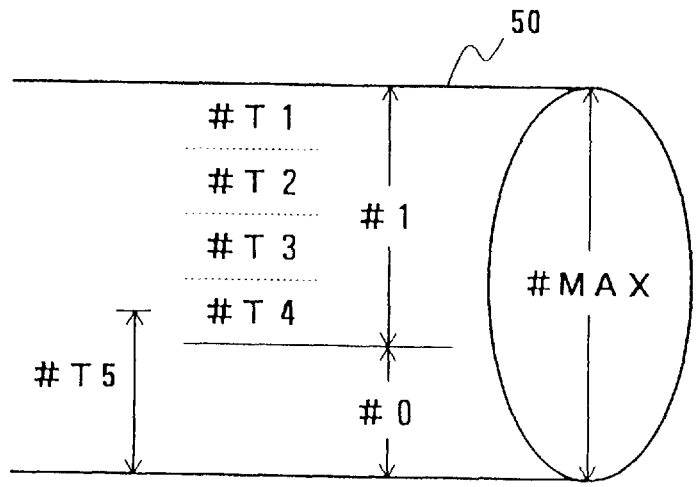
FIG. 6 is a schematic illustrating a connection request acceptance process performed by the ATM exchange of the first embodiment.

When the empty band value exceeds the required band value, the control device 200 accepts and connects the connection request and reduces by the required band value the empty band value pertaining to the intended route in the band management table 303. Conversely, when the empty band value is lower than the required band value, the control device 200 gives a message that connection is denied to the terminal that has issued the connection request. As schematically shown in FIG. 6, for example, the control device 200 gives a message that connection is denied to a terminal T5 that has issued a connection request in a case in which the terminal T5 has requested that a call be connected at a band value #T5 that exceeds the empty band value #0 (equal to #MAX−(#T1+#T2+#T3+#T4)) when terminals T1 through T4 use bands #T1 through #T4, respectively.

<Camp-on Request Registration Procedure>

A camp-on request is a request issued by a terminal that has been notified of a connection refusal; the control device 200 executes the camp-on request registration procedure upon receipt of a camp-on request.

The structures of the temporarily saved band value management table 305 and the camp-on request management table 304 used during the camp-on request registration procedure will first be described.

Figure 7:
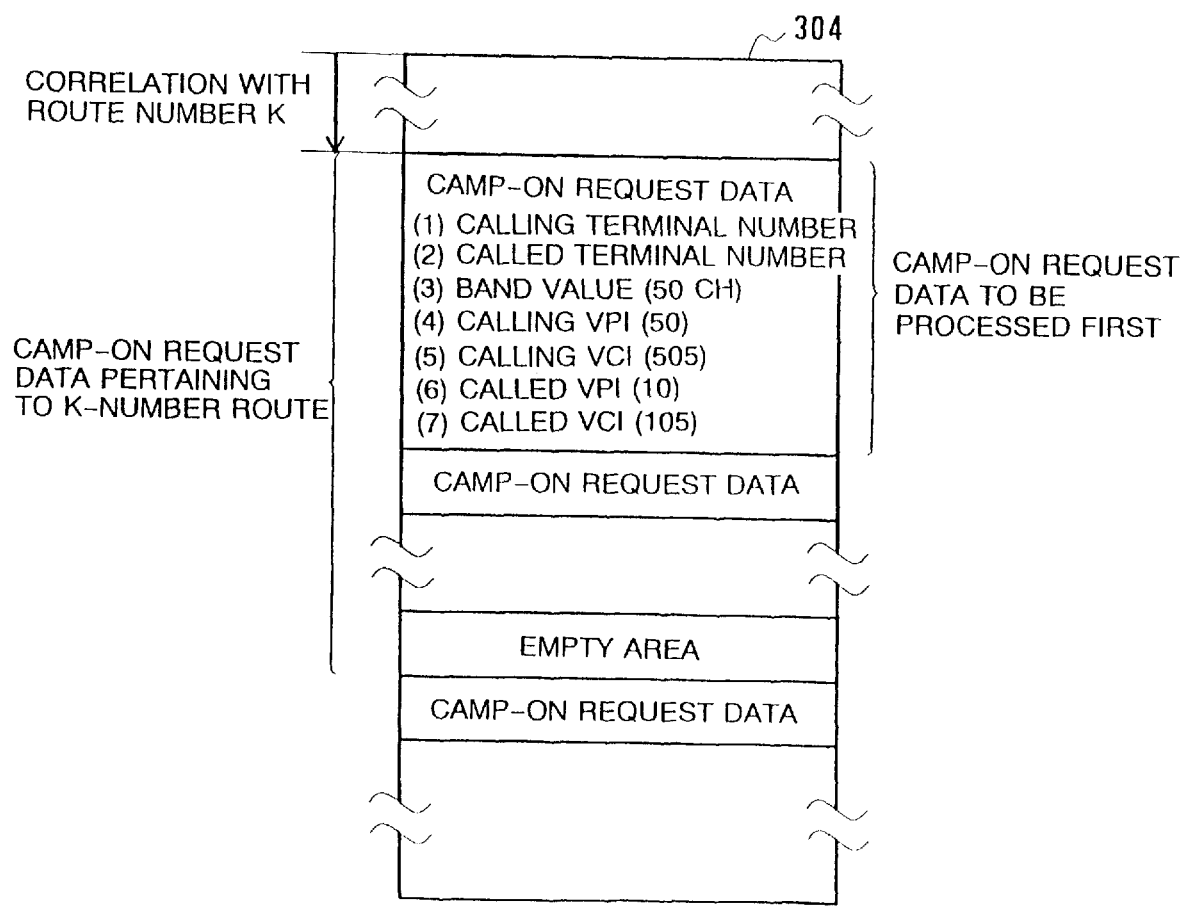
FIG. 7 is a block diagram of a camp-on request management table accommodated in the ATM exchange of the first embodiment.

FIG. 7 depicts the structure of the camp-on request management table 304. As shown in the figure, the camp-on request management table 304 comprises a plurality of storage areas, each capable of storing a single piece of camp-on request data. As is also shown in the figure, camp-on request data comprises the same data as the call management data.

A prescribed number of storage areas in which the storage area whose position corresponds to the route number is the leading area are used to store camp-on request data concerning the route having this route number in the camp-on request management table 304. The storage area serving as a leader in a group of storage areas related to a rout is a storage area for storing camp-on request data in which permission for communication is initially granted with respect to this route.

Figure 8:
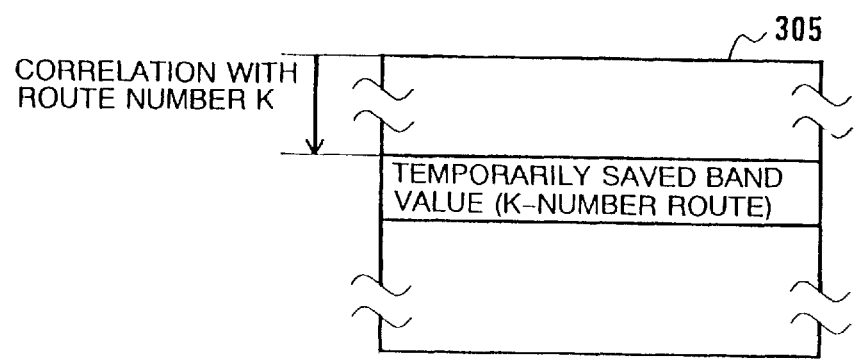
FIG. 8 is a block diagram of a temporarily saved band value management table accommodated in the ATM exchange of the first embodiment.

FIG. 8 depicts a structure of the temporarily saved band value management table 305. In the temporarily saved band value management table 305, band values (temporarily saved band values) secured for camp-on requests are stored for each route. As shown in the figure, the temporarily saved band value management table 305 comprises a plurality of storage areas for storing temporarily saved band values, and a temporarily saved band value pertaining to a route with the route number K is stored in a storage area whose position corresponds to the route number K.

The operating procedure of the control device 200 performed during the connection request acceptance procedure will now be described with reference to FIG. 9.

As shown in the figure, during the connection request acceptance procedure, the control device 200 first accesses the routing table 302 on the basis of the called terminal number contained in the received camp-on request, and the route to be used for this call is specified (step S101). The control device 200 subsequently searches (step S102) for the first (closest to the leading side) empty area in the group of storage areas pertaining to the specified route (hereinafter referred to as "the intended route").

When there is no empty area (step S103; N), the request terminal is notified (step S108) that camp-on registration cannot be performed, and the camp-on request registration procedure is completed.

When, however, there is an empty area (step S103; Y), it is determined (step S104) whether or not this empty area is the leading storage area.

As will be described below, camp-on request data are registered (stored) in the first (closest to the leading side) empty area of the group of storage areas pertaining to the intended route in the camp-on request registration procedure. No other camp-on requests pertaining to the intended route will therefore be registered when the leading storage area of the group of storage areas pertaining to the intended route is the empty area of the camp-on request management table 304. In addition, the fact that the empty area is other than the leading storage area will indicate that other camp-on requests have already been registered.

The control device 200 therefore determines that the received camp-on request is the first request pertaining to this intended route when the leading storage area pertaining to the intended route is an empty area (step S104; Y), and executes a procedure whereby the corresponding empty band value is secured for this camp-on request.

Specifically, the control device 200 stores (step S105) the empty band value #0, which pertains to the intended route and which is stored in the band management table 303, in the temporarily saved band value management table 305 as a temporarily saved band value pertaining to this route. The empty band value #0 that pertains to this route and that is contained in the band management table 303 is subsequently zero-cleared (step S106).

The control device 200 then registers (step S107) the call management data (camp-on request data) that pertain to the camp-on request and that have been stored in the call management table 301 in the searched empty area of the camp-on request management table 304, completing the camp-on request registration procedure.

When the empty area is not the leading area (step S104; N), that is, when a camp-on request from another terminal has already been registered, the control device 200 does not perform the steps S105 or S106 and proceeds to the step S107, and the camp-on request thereof is registered in the searched empty area of the camp-on request management table 304.

<Band Value Updating Procedure>

The band value updating procedure is executed when communication is disrupted. During the band value updating procedure, the temporarily saved band value or the empty band value is updated in accordance with the band value released by the break in communication. In addition, permission to communicate is granted for a camp-on request registered during the band value updating procedure.

Figure 10:
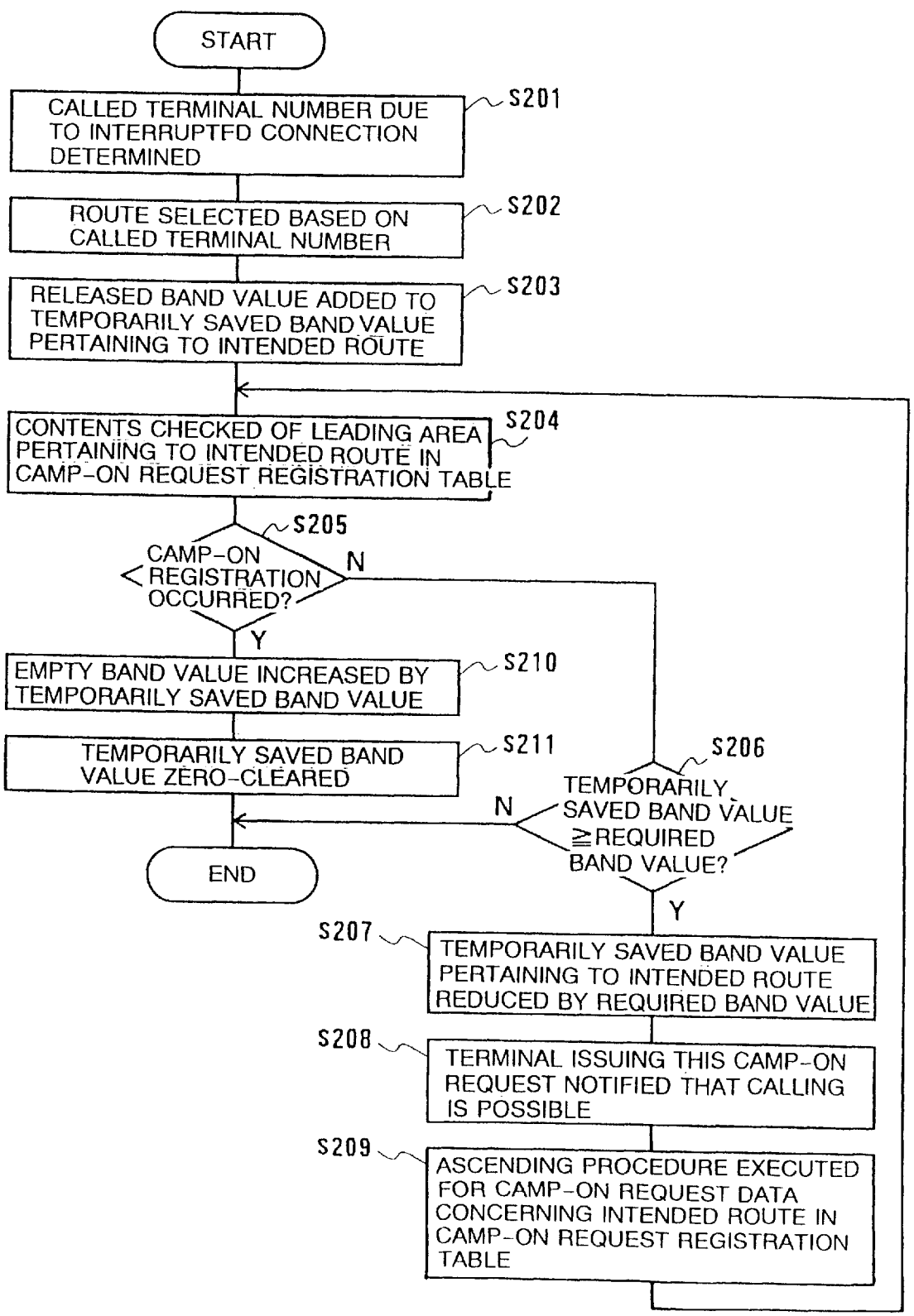
FIG. 10 is a flow chart depicting a band value updating procedure performed by the ATM exchange of the first embodiment.

FIG. 10 depicts the operating flow of the control device 200 during the band value updating procedure. As shown in the figure, when communication is disrupted, the control device 200 identifies (step S201), based on the contents of the call management table 301, the called terminal number pertaining to a terminated call. A route (intended route) with an open band is subsequently specified (step S202) by reading the contents of the storage area that corresponds to the called terminal number in the routing table 302. The temporarily saved band value pertaining to the intended route in the temporarily saved band value management table 305 is then increased (step S203) by the band value released by the break in communication.

The control device 200 then checks (step S204) whether or not any camp-on request data are stored in the leading area of the group of storage areas pertaining to the intended route in the camp-on request management table 304. During this step, these camp-on request data are read as well if any camp-on request data have been stored.

When camp-on registration has been performed (step S204; Y), the control device 200 compares (step S205) the magnitude of the band value required by this camp-on request and the magnitude of the temporarily saved band value obtained by updating the value in the step S203 (or S207), and the band value updating procedure is completed if the temporarily saved band value is lower than the required band value (step S206; N).

In addition, when the temporarily saved band value exceeds the required band value (step S206; Y), the temporarily saved band value is reduced (step S207) by the required band value, and a message is given (step S208) that calling is possible from the terminal that has issued this camp-on request.

The control device 200 then performs (step S209) an ascending procedure for the camp-on request data pertaining to the intended route in the camp-on request management table 304. Specifically, the control device 200 clears the contents of the leading storage area and copies the contents of the second and subsequent storage areas to the leading storage area in an amount corresponding to one storage area.

The operation returns to the step S204 in order to determine whether the remaining camp-on requests pertaining to the intended route can be processed using the temporarily saved band value updated in the step S207.

When the check in the step S207 has indicated (step S205; N) that the leading area is an empty area, the control device 200 increases (step S210) the empty band value pertaining to the intended route in the band management table 303 by the temporarily saved band value calculated in the step S203 or S207, and zero-clears (step S211) the temporarily saved band value pertaining to the intended route in the temporarily saved band value management table 305, completing the band value updating procedure.

Figure 11:
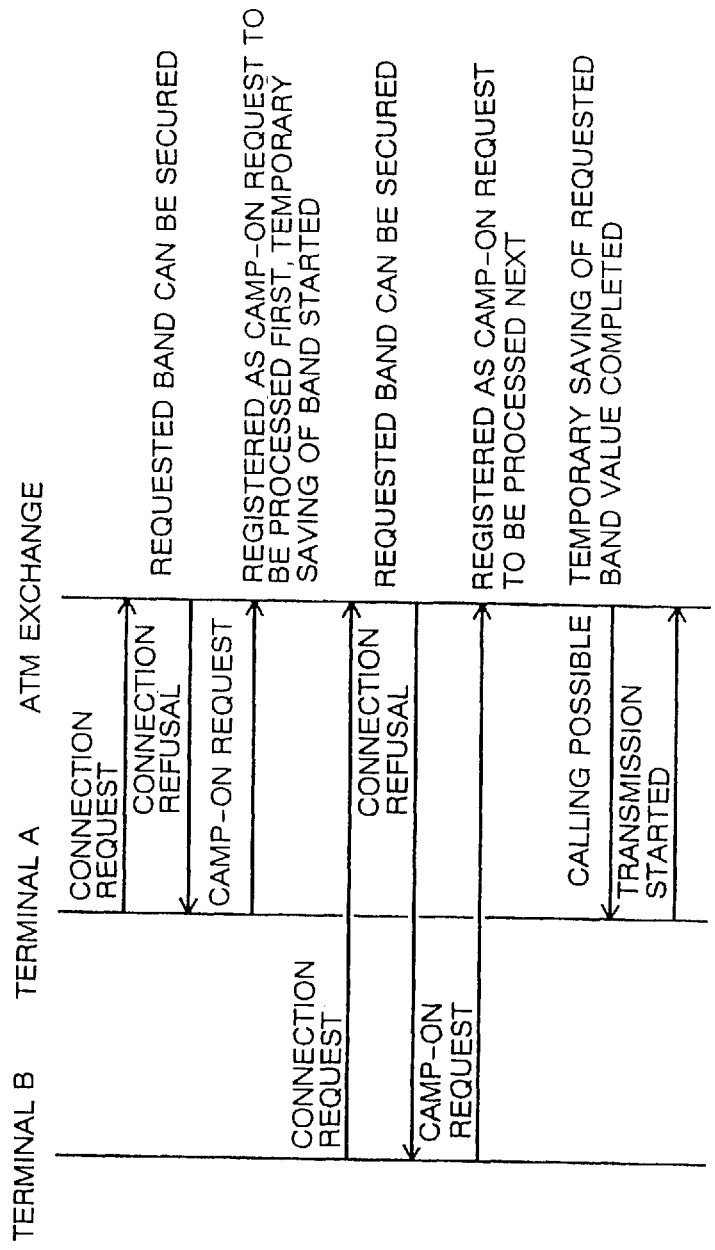
FIG. 11 is a sequence diagram for terminals and the ATM exchange of the first embodiment.

The overall operation of the ATM exchange of the first embodiment aimed at handling camp-on requests will now be described with reference to FIG. 11.

A connection request acceptance procedure is first executed in the ATM exchange when a connection request has been received from a terminal A. The terminal is notified of a refusal to connect when no required band value can be secured, as shown in the figure. The terminal A that has received the refusal to connect issues a camp-on request, and a camp-on request registration procedure is executed in the ATM exchange that has received the camp-on request.

When the camp-on request issued by the terminal in this case pertains to a route for which no camp-on request has yet been registered, a procedure in which the unused band pertaining to this route is temporarily saved for this camp-on request is started in the ATM exchange.

As described with reference to FIG. 10, the empty band value pertaining to the intended route is maintained at a zero level in this ATM exchange during the period between the receipt of a camp-on request and the temporary saving of a band that exceeds the required band value. The result is that when a terminal A has issued a camp-on request, and another terminal (terminal B) then issues a connection request with respect to the intended route, the ATM exchange gives a message that this connection request is denied, as shown in FIG. 11. In addition, upon receipt of the camp-on request from the terminal B, the ATM exchange registers this camp-on request as the next item to be processed in the camp-on request management table 304.

A band value updating procedure is executed in the ATM exchange every time the communication is disrupted following the registration of a camp-on request from the terminal A. When a temporarily saved band value has exceeded the band value required by the camp-on request from the terminal A, permission to communicate is issued for this camp-on request.

Thus, with the ATM exchange of the first embodiment, accepting a camp-on request excludes acceptance of any other connection request, and all the band values that are subsequently released are secured (temporarily stored) for this camp-on request. Permission for a camp-on request is therefore issued in a short time and irrespective of the magnitude of the required band value in a communications system in which the present ATM exchange is used.

Second Embodiment

Figure 12:
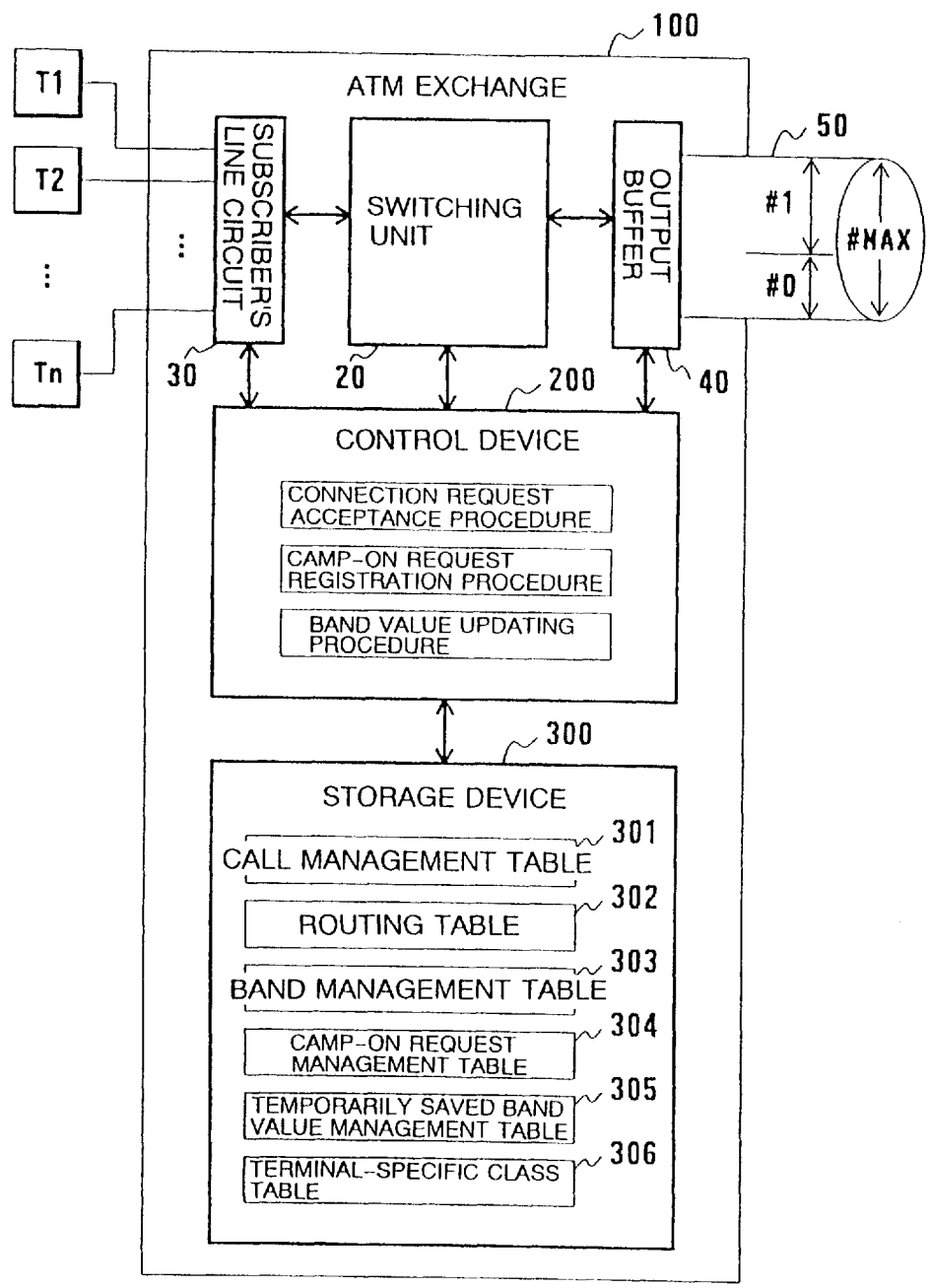
FIG. 12 is a block diagram depicting the structure of the ATM exchange pertaining to a second embodiment of the present invention.

FIG. 12 depicts a schematic structure of the ATM exchange pertaining to a second embodiment of the present invention.

As is shown in the figure, a terminal-specific class table 306 is accommodated in addition to the already described various tables in the storage device 300 of the ATM exchange 100 of the second embodiment.

Figure 13:
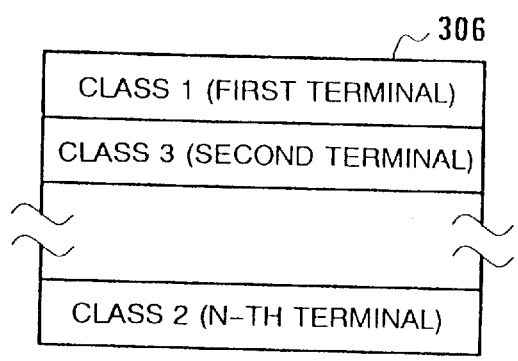
FIG. 13 is a block diagram of a terminal-specific class table accommodated in the ATM exchange of the second embodiment.

FIG. 13 depicts the structure of the terminal-specific class table 306. As is shown in the figure, the terminal-specific class table 306 stores interrelations between terminals and classes, which are the parameters used when the order for registering camp-on requests is established.

In the ATM exchange 100 of the second embodiment, the camp-on request registration procedure is executed by accessing the contents of the terminal-specific class table 306. The connection request acceptance procedure and the band value updating procedure executed in the ATM exchange of the second embodiment are the same as in the first embodiment, and their description will therefore be omitted.

Figure 14:
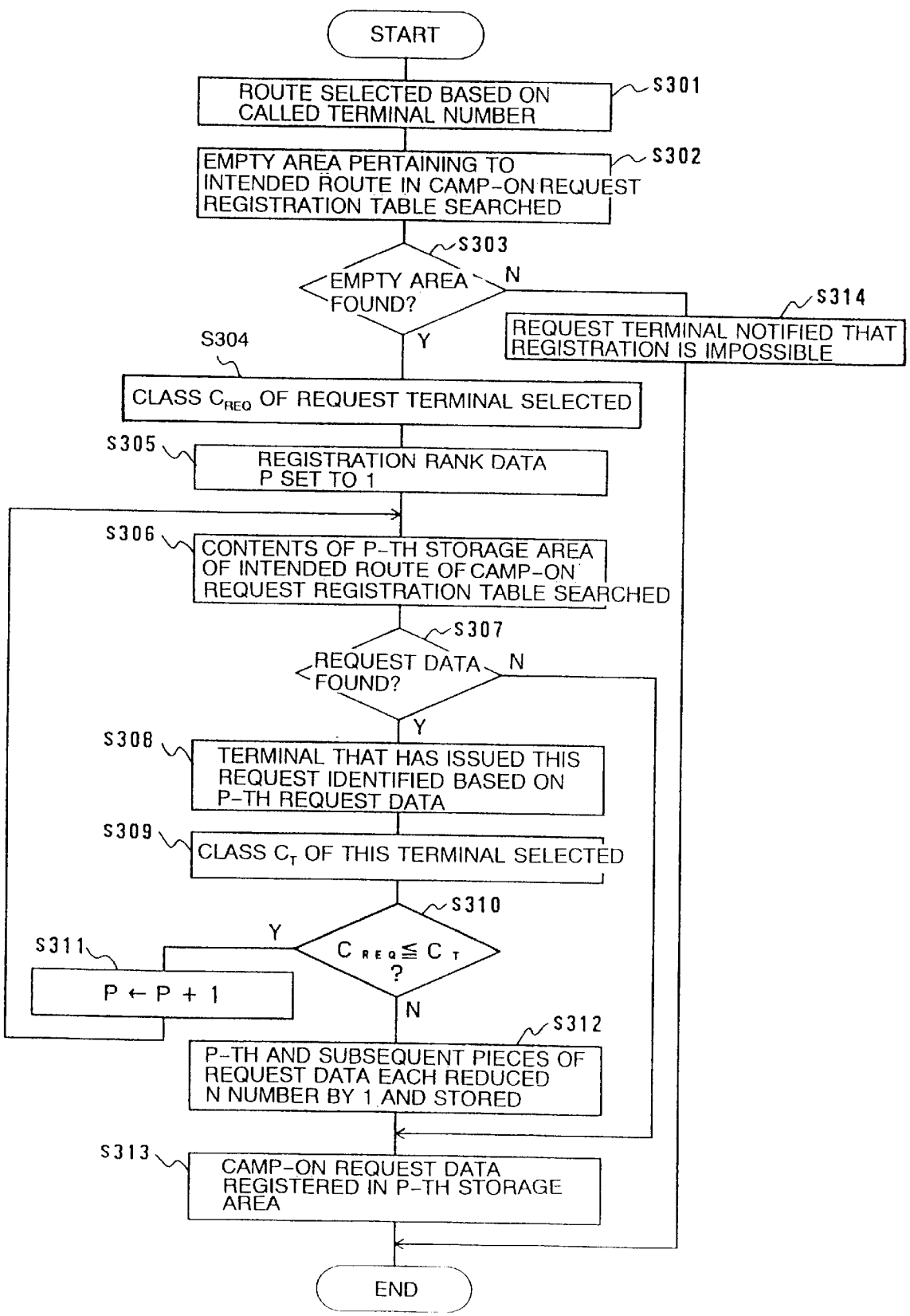
FIG. 14 is a flow chart depicting a camp-on request registration procedure performed by the ATM exchange of the second embodiment.

FIG. 14 depicts the processing sequence of the camp-on request registration procedure executed in the ATM exchange of the second embodiment. As is shown in the figure, when a camp-on request is received from a terminal, a control device 200 accesses a routing table 302 on the basis of the called terminal numbers contained in the camp-on request table thereof, and selects (step S301) the route to be used for this request. A search is then performed (step S302) for the first empty area that pertains to a prescribed route (intended route) in the camp-on request management table 304 accommodated in the storage device 300.

When there is no empty area (step S303; N), the request terminal is notified (step S314) that camp-on registration cannot be performed, and the procedure is completed.

When there is an empty area (step S303; Y), the class $C_{REQ}$ of the request terminal is specified (step S304) by accessing the terminal-specific class table 306. The control device 200 then initializes (step S305) registration rank data P to "1." The registration rank data P are data for specifying the storage areas in which camp-on request data are to be registered; the storage device 300 contains storage areas for storing the registration rank data P.

Following the initialization of the registration rank data P, the control device 200 checks (step S306) the contents of the P-th storage area pertaining to the intended route in a camp-on request management table, and when camp-on request data are stored in this storage area (step S307; Y), the terminal (hereinafter referred to as "the intended terminal") that has issued this camp-on request is identified (step S308) based on these camp-on request data. The class $C_T$ of the intended terminal is subsequently identified (step S309) by accessing the terminal-specific class table 306. The magnitudes of $C_{REQ}$ and $C_T$ are subsequently compared, "1" is added (step S311) to the registration rank data P when $C_{REQ}$ is higher than $C_T$ (step S310; N), and the operation returns to the step S306.

When $C_{REQ}$ is lower than $C_T$ (step S310; Y), the control device 200 reduces by one the number of each of the P-th and subsequent pieces of camp-on request data in order to make the P-th storage area into an empty area, and stores the results again (step S312). The received camp-on request data are registered (step S313) in the P-th storage area made into an empty area, completing the camp-on request registration procedure.

In addition, the operation proceeds to the step S313 and the camp-on request data are stored in the storage area when checking the contents of the P-th area during the step S307 indicates that this area is an empty area (step S307; N).

Figure 9:
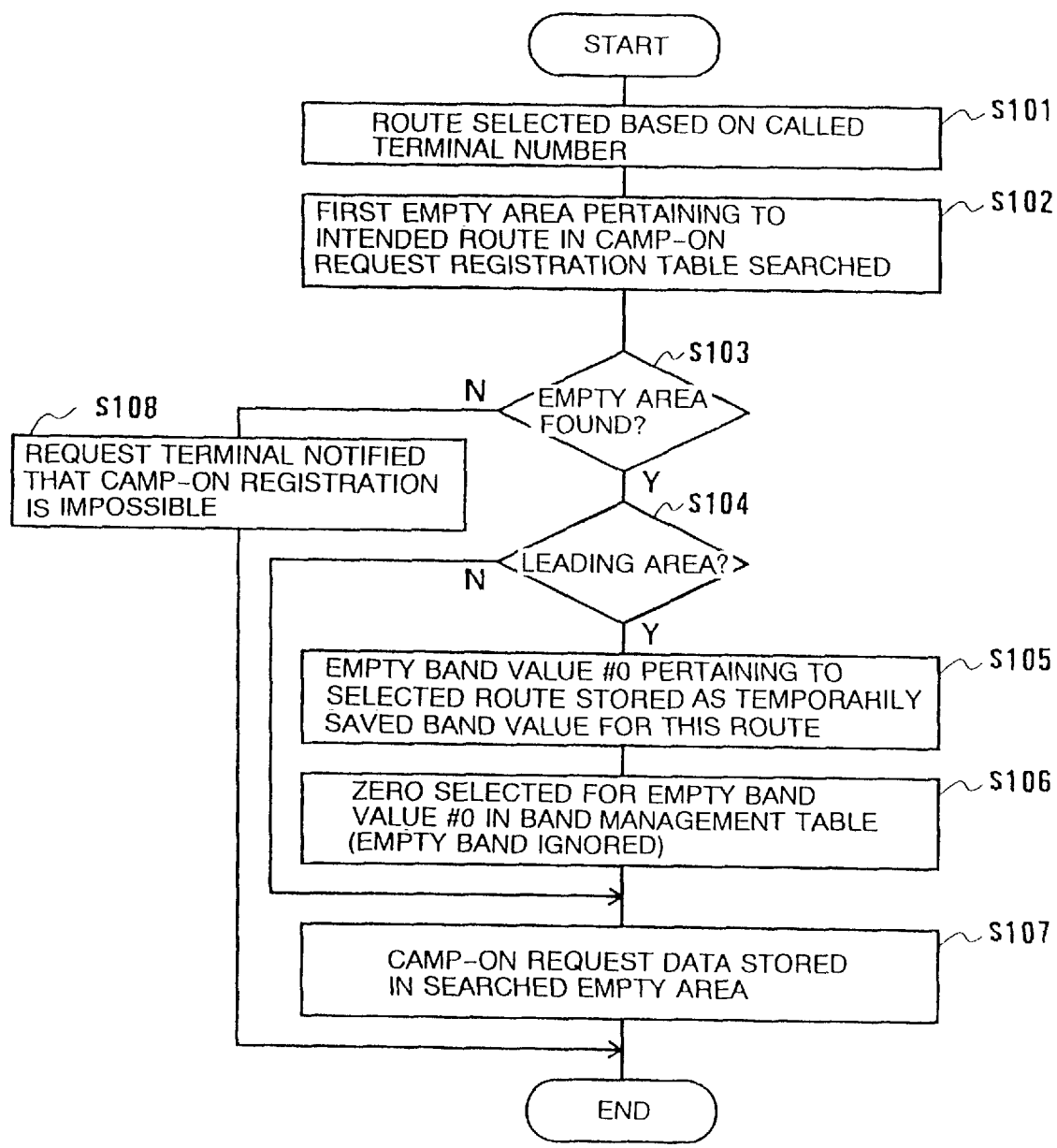
FIG. 9 is a flow chart depicting a camp-on request registration procedure performed by the ATM exchange of the first embodiment.

Although this is not shown in the flow chart, the same procedures as those involved in the steps S105 and S106 in FIG. 9 are executed when initial camp-on request data pertaining to the intended route are stored in the leading (P=1) storage area during the step S313. Specifically, a procedure is performed in which the empty band value of the corresponding intended route is secured for the received camp-on request.

In addition, procedures corresponding to the steps S206 through S209 in FIG. 10 are executed when camp-on request data other than the initial data pertaining to the intended route are stored in the leading (P=1) storage area. Specifically, when comparison is performed between the magnitude of the required band value of a camp-on request newly registered in the leading storage area and the magnitude of the temporarily saved value pertaining to the intended route in the temporarily saved band value management table 305, and the required band value is lower, permission to communicate is granted to the terminal that has issued this camp-on request.

As described above, the present camp-on request registration procedure allows camp-on request data from a terminal having a high assigned class to be stored in a storage area that is closer to the leading side and that is selected from among a group of storage areas pertaining to the intended route of the camp-on request management table 304.

Figure 15:
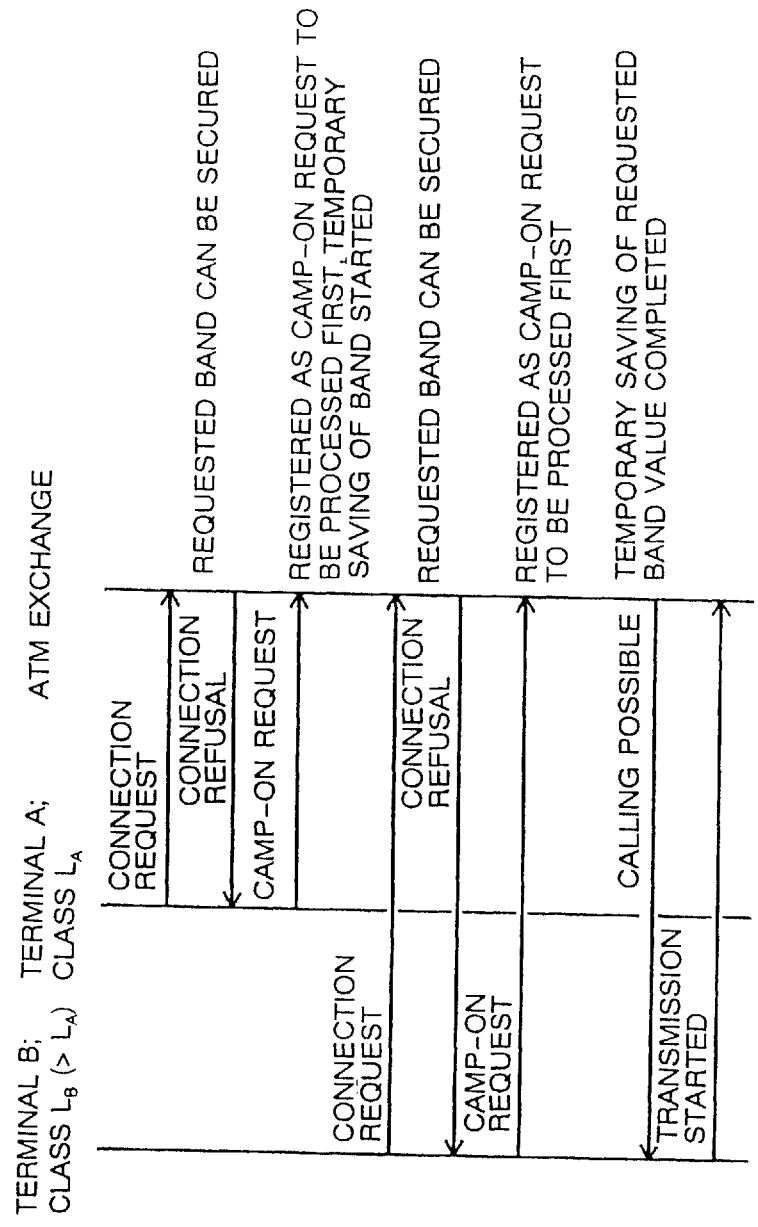
FIG. 15 is a sequence diagram for terminals and the ATM exchange of the second embodiment.

As schematically shown in FIG. 15, a camp-on request from a terminal B is therefore registered as the item to be processed first in an ATM exchange when, for example, a camp-on request is received from a terminal A that has been assigned a class $L_A$, and a camp-on request is then received from a terminal B that has been assigned a higher class $L_B$ (>$L_A$). The terminal B will therefore start communicating first, irrespective of the fact that it has issued a camp-on request after the terminal A has done so.

In the ATM exchange in question, as in the ATM exchange of the first embodiment, no more connection requests are accepted following the acceptance of a camp-on request, and the band values that are released thereafter are all used for camp-on requests. Permission to call is therefore issued in a short time with respect to a camp-on request in a communications system in which the ATM exchange in question is used. In addition, camp-on requests are processed in the class sequence assigned to the terminals, making it possible to create a communications system that can operate in an efficient manner by employing the ATM exchange in question.

Third Embodiment

Figure 16:
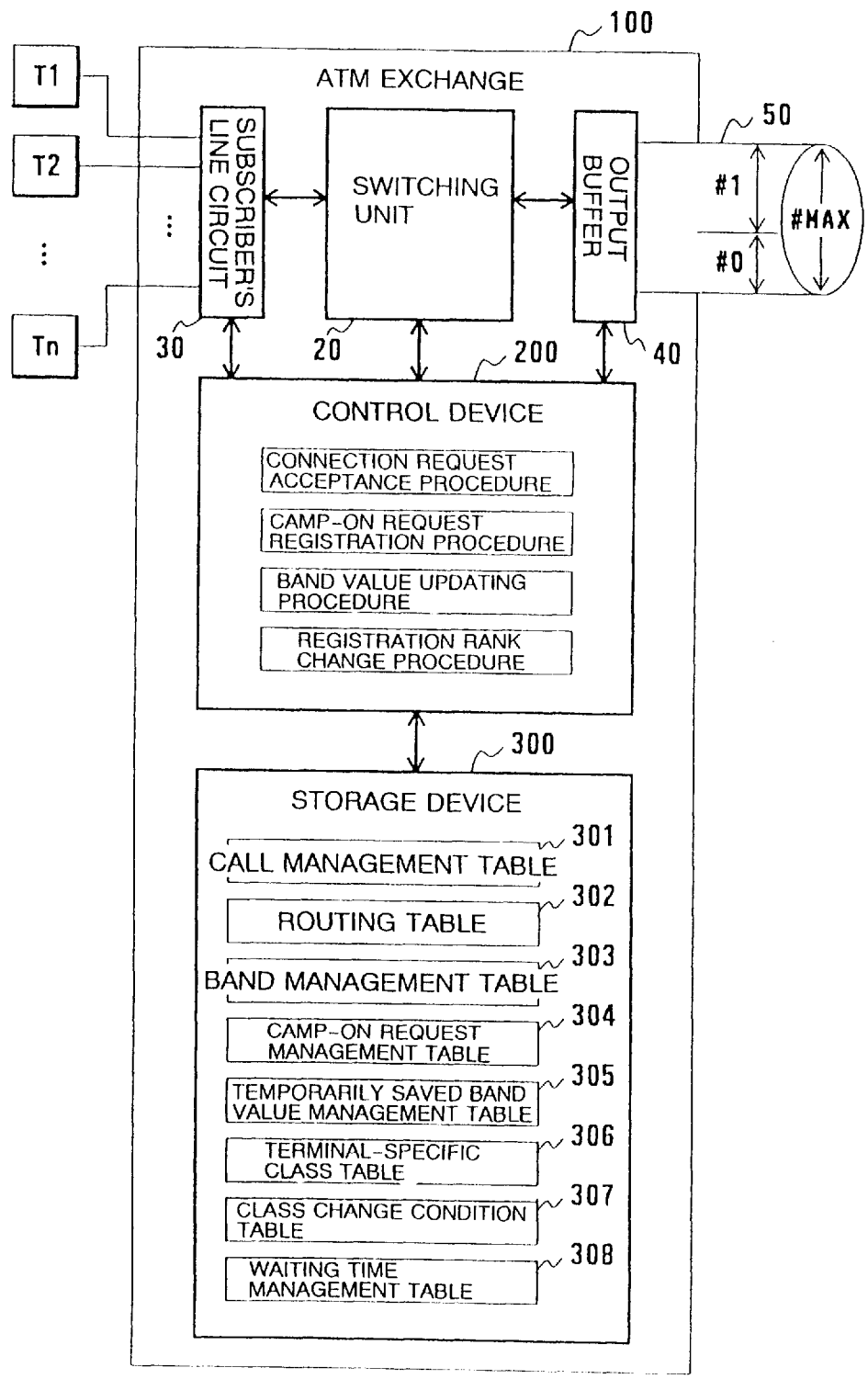
FIG. 16 is a block diagram depicting the structure of the ATM exchange pertaining to a third embodiment of the present invention.

FIG. 16 depicts a schematic structure of the ATM exchange pertaining to a third embodiment of the present invention. The ATM exchange of the third embodiment is based on the ATM exchange of the second embodiment, and, as shown in the figure, the storage device 300 thereof accommodates a class change condition table 307 and a waiting time management table 308 in addition to the already described various tables 301 through 306.

Figure 17:
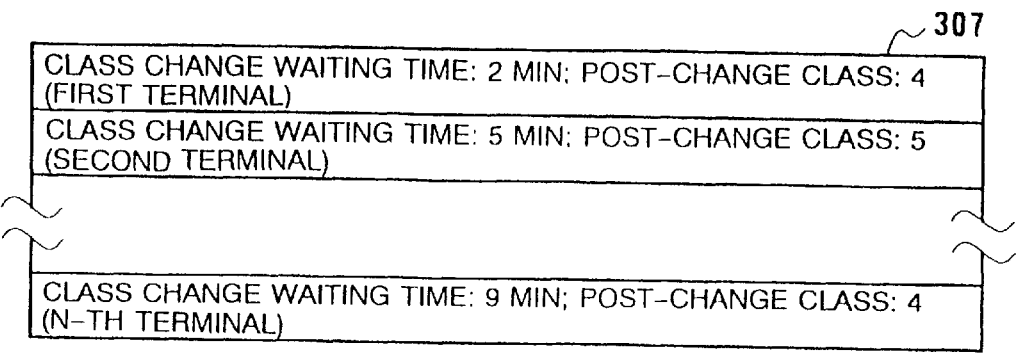
FIG. 17 is a block diagram of a class change condition table accommodated in the ATM exchange of the third embodiment.

FIG. 17 depicts the structure of the class change condition table 307. The class change waiting time and the post-change class are stored for each terminal in the class change condition table 307, as shown in the figure.

Figure 18:
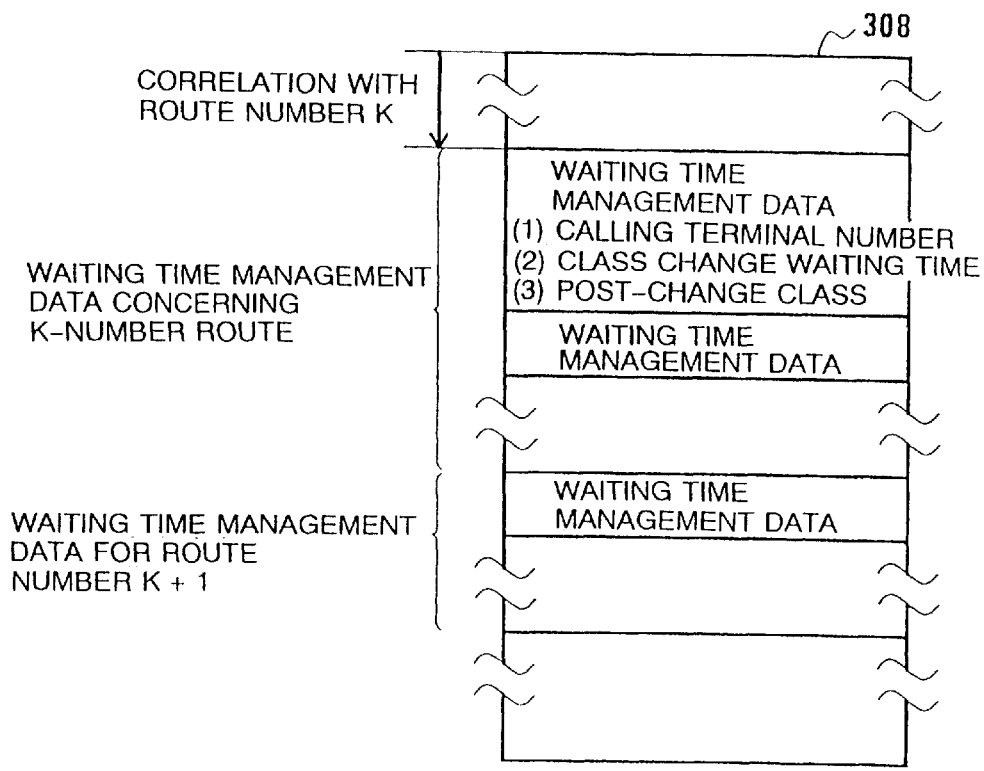
FIG. 18 is a block diagram of a waiting time management table accommodated in the ATM exchange of the third embodiment.

FIG. 18 depicts the structure of the waiting time management table 308. As shown in the figure, the waiting time management table 308 comprises a plurality of storage areas, each capable of storing a single piece of waiting time management data. The waiting time management data comprises calling terminal numbers, class change waiting times, and post-change classes. A prescribed number of storage areas, among which the storage area whose position corresponds to the route number is used as a leading storage area, are used to store the waiting time management data pertaining to the route having this route number in the waiting time management table 308.

A control device 200 executes a connection request acceptance procedure, a camp-on request registration procedure, a band value updating procedure, and a registration rank change procedure. Of these procedures, the connection request acceptance procedure and the band value updating procedure are the same as the procedures performed in the ATM exchange of the first embodiment.

The details of the camp-on request registration procedure and registration rank change procedure will now be described.

<Camp-on Request Registration Procedure>

Figure 19:
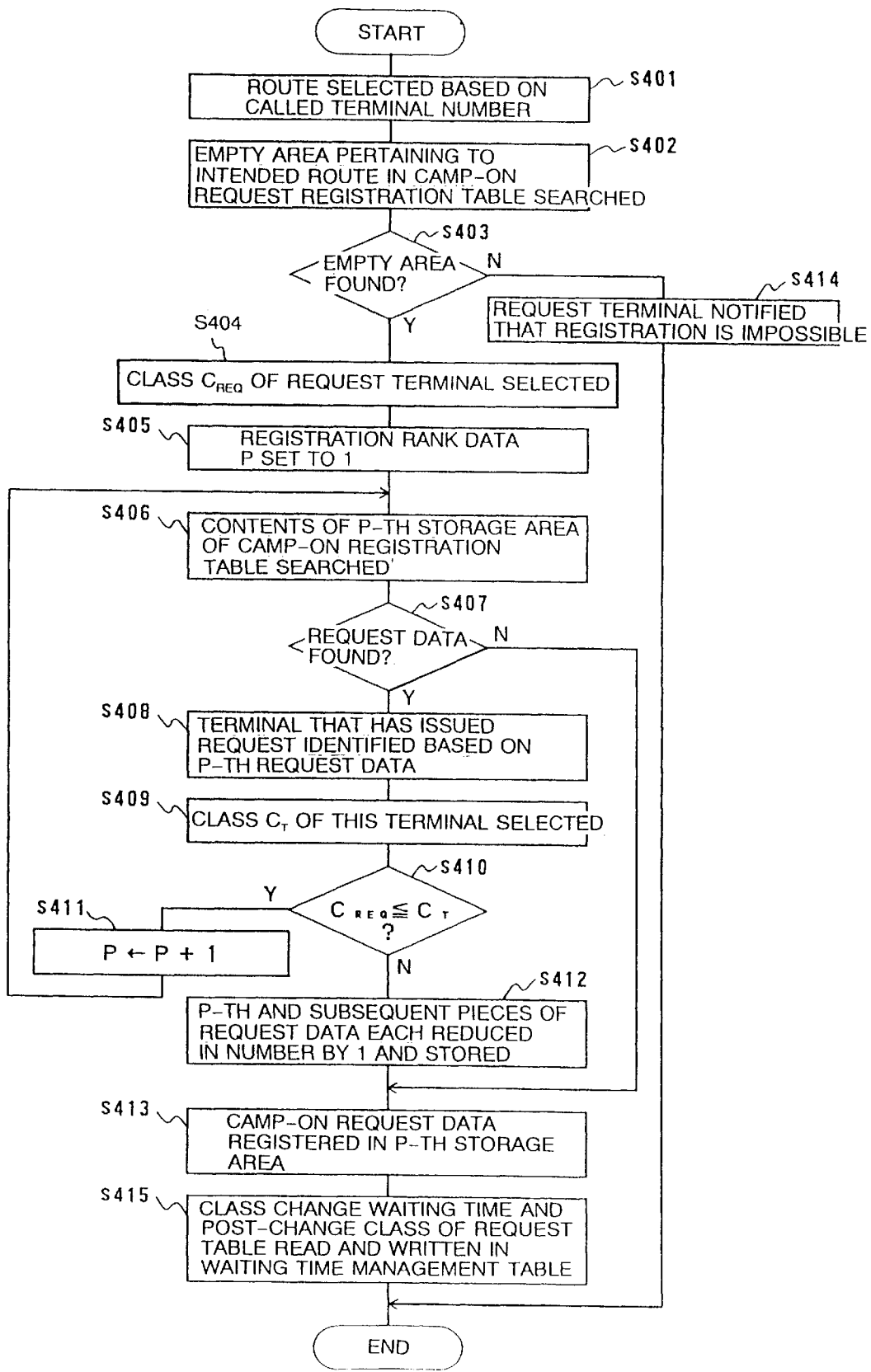
FIG. 19 is a flow chart depicting a camp-on request registration procedure performed by the ATM exchange of the third embodiment.

FIG. 19 depicts the processing sequence of the camp-on request registration procedure executed in the ATM exchange of the third embodiment. As is shown in the figure, steps S401 through S414 are the same as the steps S301 through 314 of the camp-on request registration procedure (FIG. 14) executed in the ATM exchange of the third embodiment, so the description of these steps will be omitted.

In the camp-on request registration procedure executed in the ATM exchange of the third embodiment, camp-on request data are written (step S413) in a camp-on request management table 304, and the post-change class and the class change waiting time pertaining to the request terminal are then read from the class change condition table 307 and written (step S414) in the waiting time management table 308 together with the terminal number (calling terminal number) of the terminal that has issued a camp-on request.

<Registration Rank Change Procedure>

The registration rank change procedure, which is a procedure for rearranging the camp-on request data in the camp-on request management table 304, is performed every time a prescribed period DT has elapsed.

Figure 20:
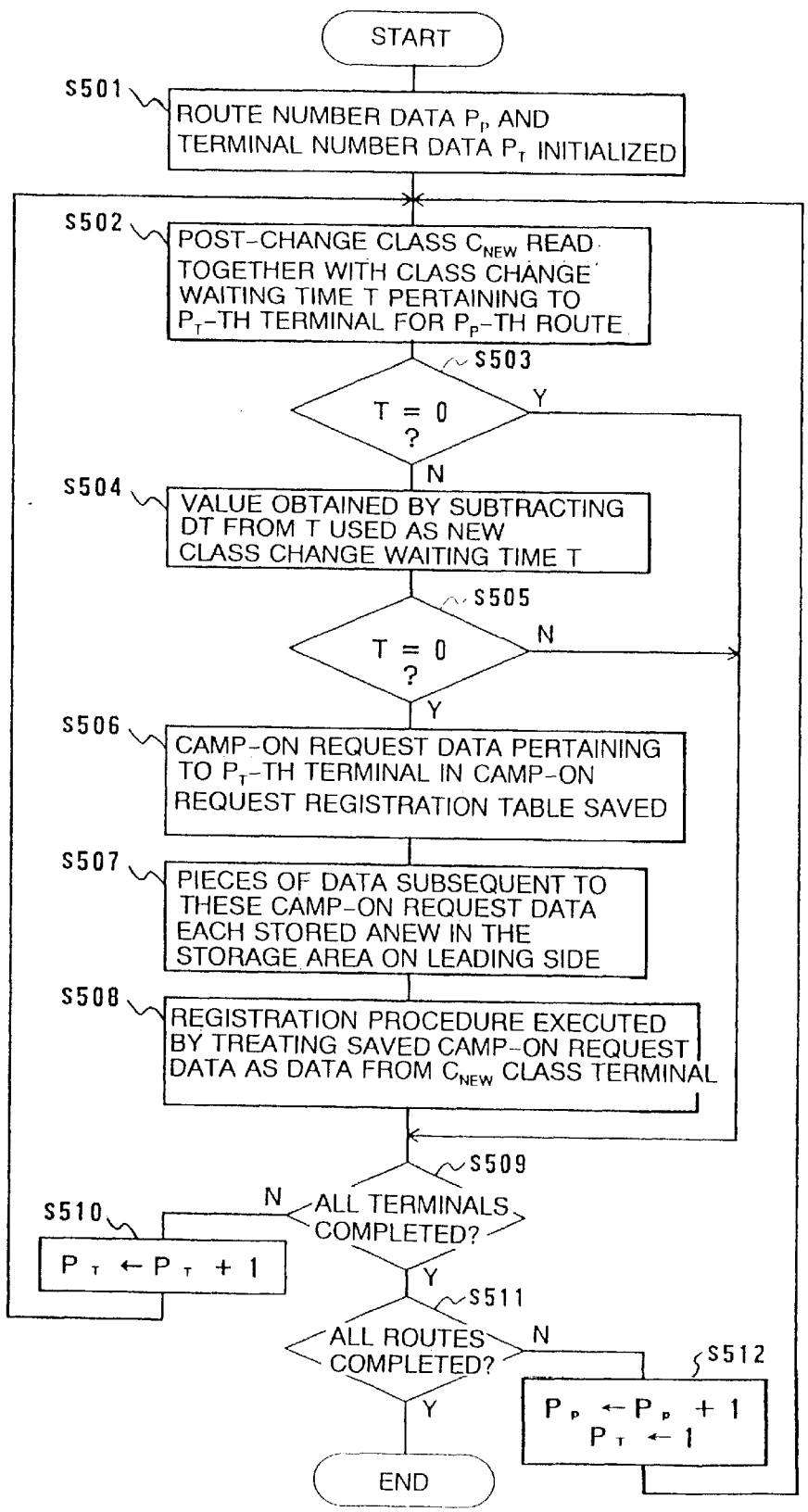
FIG. 20 is a flow chart depicting a registration rank change procedure performed by the ATM exchange of the third embodiment.

FIG. 20 depicts the operating sequence of the control device 200 during the registration rank change procedure. When the registration rank change procedure is started, the control device 200 first initializes (step S501) both the route number data $P_P$ and the terminal number data $P_T$ to "1," as shown in the figure. The route number data $P_P$ are data for specifying a single route, and the terminal number data $P_T$ are data for specifying a single terminal. Each type of data is stored in a predetermined storage area in the storage device 300.

Following the initialization of each type of data, the control device 200 reads (step S502), from the waiting time management table 308, the post-change class $C_{NEW}$ and the class change waiting time T pertaining to $P_T$-th terminal of $P_P$-th route.

If the read time T is not "0" (step S503; N), the control device 200 stores anew (step S504) the value obtained by subtracting DT from T into the waiting time management table 308 as a new class change waiting time T. The calculation result T obtained during this step is subsequently compared with "0," and when T is "0" (step S505; Y), the camp-on request data pertaining to PT-th terminal in the camp-on request management table 304 are saved (step S506) in the temporary storage area contained in the storage device 300.

A single piece of data subsequent to these camp-on request data is then stored anew (step S507) in the leading storage area, the stored camp-on request data are handled as camp-on request data from a class $C_{NEW}$ terminal, and a camp-on request registration procedure is executed (step S508). During the step S508, the step S415 is removed from the camp-on request registration procedure shown in FIG. 19, whereas during the step S410 a procedure using $C_{NEW}$ instead of $C_{REQ}$ is executed.

The control device 200 determines whether or not processing has been completed for all the terminals. If it has not (step S509; N), then "1" is added (step S510) to terminal number data $P_T$, and the operation returns to the step S502. If processing has been completed for all the terminals (step S509; Y), it is determined whether or not processing has been completed for all the routes. If processing has not been completed for all the routes (step S511; N), "1" is added to route number data $P_P$ and "1" is set to the terminal number data $P_T$ (step S512), and the operation returns to the step S502.

In addition, if the time T is "0" during the step S503, the class has already been changed, so the control device 200 proceeds to the step S509, and the processing of the next portion of data is started. In addition, if the time T is "0" during the step S505, the designated time has not yet elapsed, so the control device 200 proceeds to the step S509, and the processing of the next portion of data is started.

The registration rank updating procedure is accomplished when the control device 200 has finished (step S511;Y) processing all the routes.

Thus, in the registration rank change procedure, the class change waiting times T that have been copied to the waiting time management table 308 are reduced in DT increments, and when T becomes "0," the registration rank of the corresponding camp-on request data is changed in accordance with the post-change class of the terminal that has issued the request.

The overall processing sequence involving a camp-on request of the ATM exchange of the third embodiment will now be described with reference to a specific example.

A case will be considered in which immediately after (within two minutes) a camp-on request for a certain route has been received for the first time from a first terminal for which a class of one, a class change waiting time of two minutes, and a post-change class of four are specified, a camp-on request is obtained for the same route from a second terminal for which a class of three, a class change waiting time of five minutes, and a post-change class of five are specified.

In this case, in the camp-on request registration procedure executed when a camp-on request has been received from the second terminal (FIG. 19), the class of the second terminal is higher than the class of the first terminal, so steps S412, S413, and S415 are executed at a stage in which P=1. As a result, the camp-on request data pertaining to the second terminal are stored in the leading storage area pertaining to the intended route of the camp-on request management table 305, and the camp-on request received from the first terminal is stored in the next storage area.

Furthermore, in the ATM exchange of the third embodiment, the registration rank change procedure is repeated every DT, and in reality the registration rank of a camp-on request is changed two minutes after the camp-on request has been received from the first terminal. Until this time, therefore, the camp-on request data pertaining to the second terminal remain stored in the leading storage area in the camp-on request management table 304.

Figure 21:
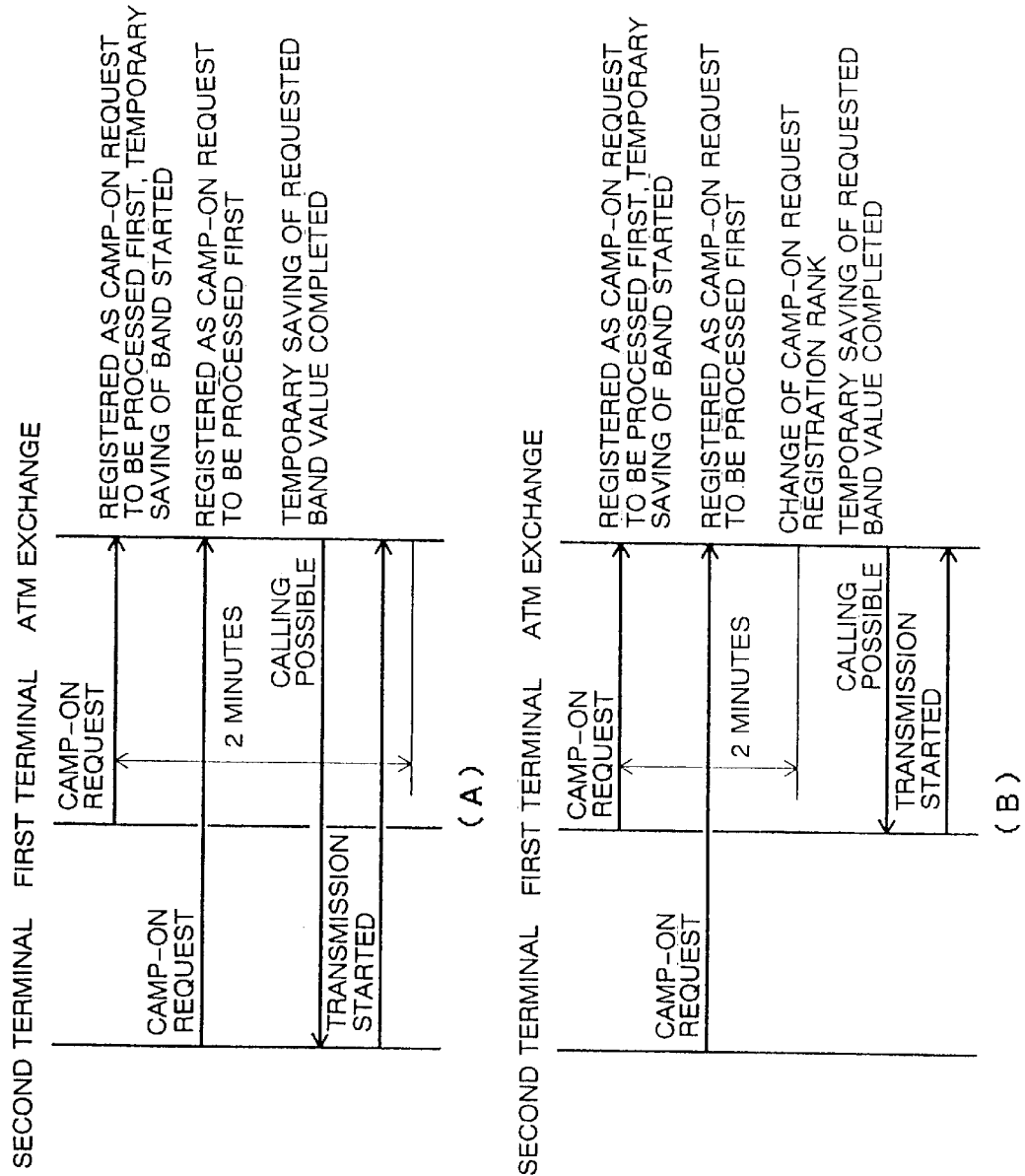
FIG. 21 is a sequence diagram for terminals and the ATM exchange of the third embodiment.

Therefore, as schematically shown in FIG. 21A, permission to communicate is granted with respect to a camp-on request from the second terminal when a temporarily saved band value sufficient for responding to the camp-on request from the second terminal is secured before two minutes have elapsed.

On the other hand, if a temporarily saved band value sufficient for responding to a camp-on request from the second terminal is not secured after two minutes have elapsed following receipt of a camp-on request from the first terminal, steps S506 through S508 involving a registration rank change procedure will be executed for the first terminal when two minutes have elapsed. Because at this time the post-change class of the first terminal is "4," which is higher than the class ("3") of the second terminal, the camp-on request data pertaining to the first terminal and the camp-on request data pertaining to the second terminal are transposed in storage areas.

Therefore, as schematically shown in FIG. 21B, it is the first terminal for which permission to communicate is granted by the band value updating procedure executed following this transposition.

Thus, in the ATM exchange of the third embodiment, the processing order (registration rank) of a camp-on request can be changed when a prescribed time has elapsed following the acceptance of the camp-on request, making it possible to efficiently deal with camp-on requests received from terminals by setting data that correspond to the usage frequency or intended use of each terminal in the terminal-specific class table 306 and the class change condition table 307.

Fourth Embodiment

Figure 22:
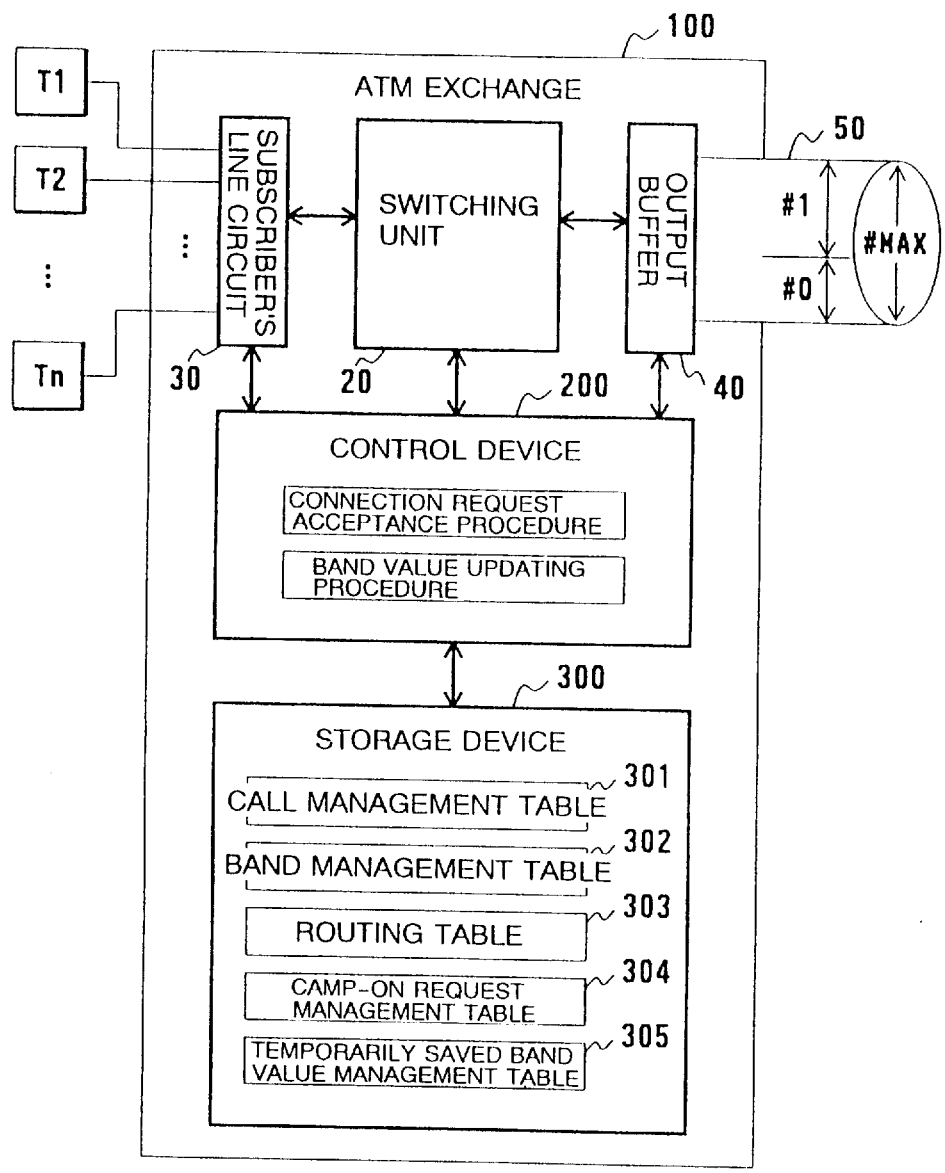
FIG. 22 is a block diagram depicting the structure of the ATM exchange pertaining to a fourth embodiment of the present invention.

FIG. 22 depicts the structure of the ATM exchange of a fourth embodiment. The ATM exchange of the fourth embodiment is based on the ATM exchange of the first embodiment, and the tables used during its operation are the same as in the ATM exchange of the first embodiment.

Unlike in the ATM exchange of the first embodiment, where a camp-on request is registered by a camp-on request from a terminal, the ATM exchange of the fourth embodiment automatically registers a camp-on request during the connection request acceptance procedure.

Figure 23:
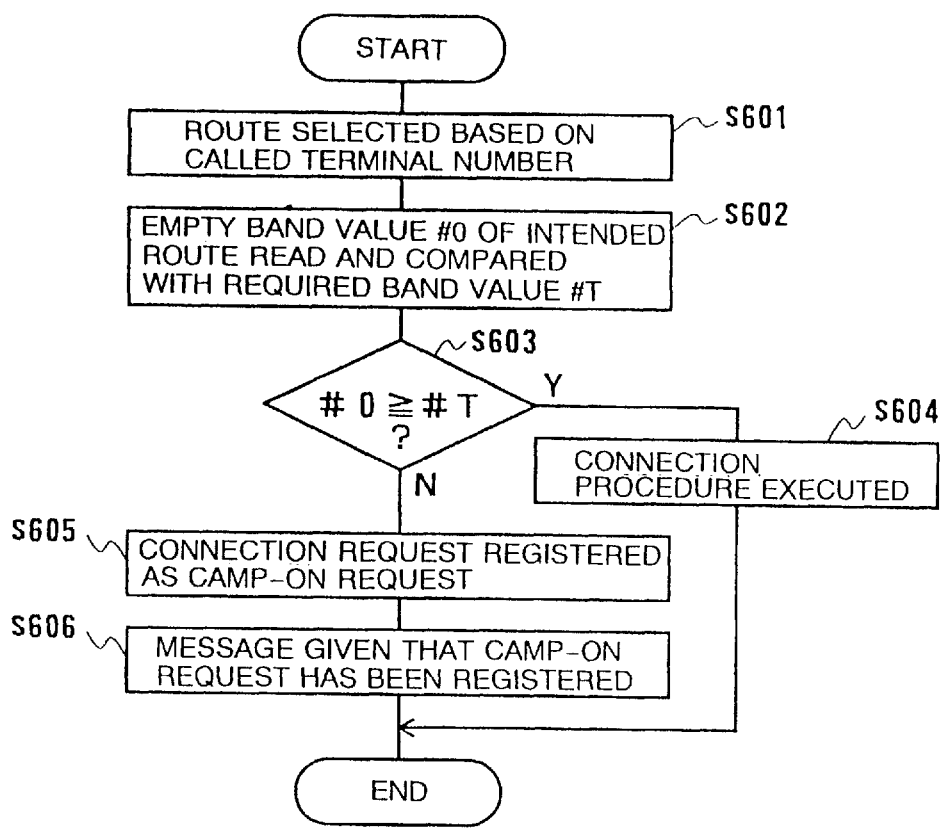
FIG. 23 is a flow chart depicting a connection request acceptance procedure performed by the ATM exchange of the fourth embodiment.

FIG. 23 depicts the processing sequence of the connection request acceptance procedure executed in the ATM exchange of the fourth embodiment. As shown in the figure, a control device 200 first specifies (step S601) the route on the basis of the called terminal number when a connection request for a call is received from a terminal. The empty band value #0 pertaining to the intended route is subsequently read from a band management table 303, and the value thereof is compared (step S602) with the required band value #T.

When the empty band value #0 exceeds the required band value #T (step S603; Y), a connection procedure is executed (step S604), completing the connection request acceptance procedure. When the empty band value #0 is lower than the required band value #T (step S603; N), the connection request is registered (step S605) as a camp-on request, and the calling terminal is notified (step S606) that a camp-on request has been registered. When registration is performed during the step S605, the same procedure is executed as the camp-on request registration procedure performed in the ATM exchange of the first embodiment.

Figure 24:
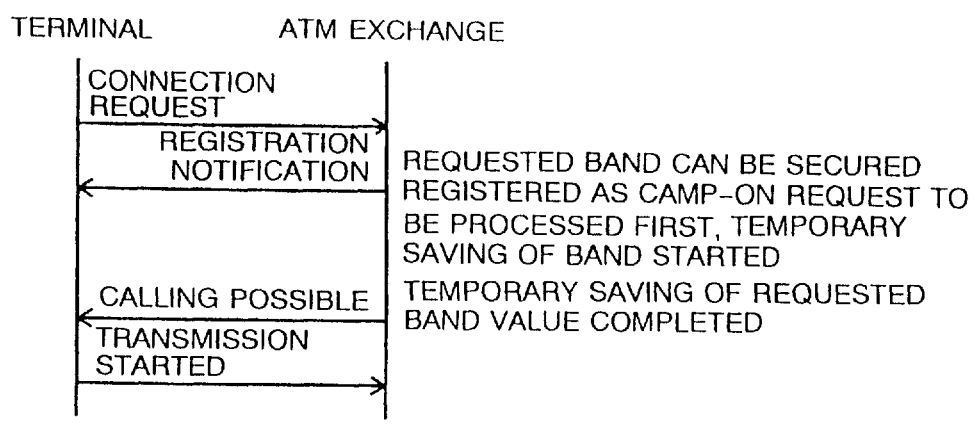
FIG. 24 is a sequence diagram for terminals and the ATM exchange of the fourth embodiment.

Specifically, a connection request is automatically registered as a camp-on request, and a terminal is notified of this fact, when there is no adequate empty band upon receipt of the connection request from the terminal by the ATM exchange of the fourth embodiment, as schematically shown in FIG. 24. The band value updating procedure is repeated every time connection is broken, and the terminal is notified of permission to call when a temporarily saved band value exceeding the required band value of the automatically registered camp-on request is obtained.

Fifth Embodiment

Figure 25:
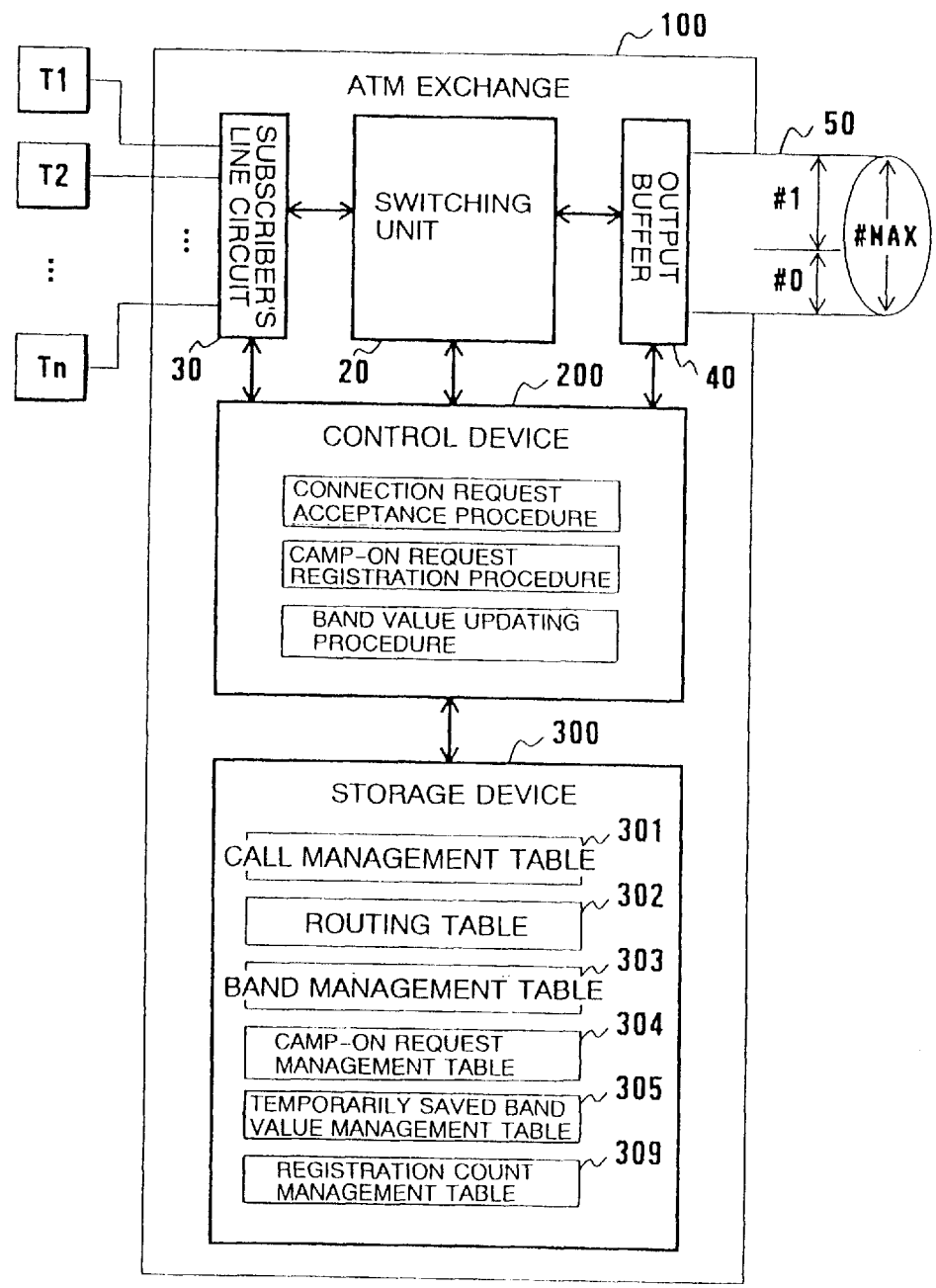
FIG. 25 is a block diagram depicting the structure of the ATM exchange pertaining to a fifth embodiment of the present invention.

FIG. 25 depicts a schematic structure of the ATM exchange pertaining to a fifth embodiment of the present invention. The ATM exchange of the fifth embodiment is based on the ATM exchange of the first embodiment, and the storage device 300 thereof accommodates a registration count management table 309 in addition to the various tables 301 through 305 described above.

Figure 26:
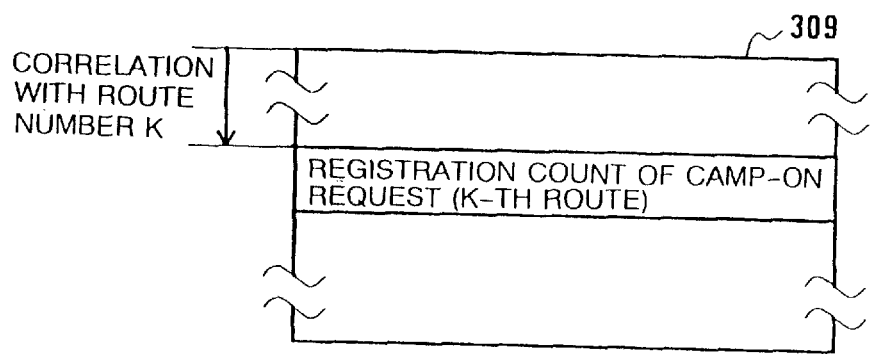
FIG. 26 is a block diagram of a registration number management table accommodated in the ATM exchange of the fifth embodiment.

FIG. 26 depicts the structure of the registration count management table 309. As shown in the figure, the registration count management table 309 is a table for storing the registration count of camp-on requests for each route. In the registration count management table 309, the registration count of camp-on requests for a certain route is stored in the storage area whose position corresponds to the route number of this route.

Figure 27:
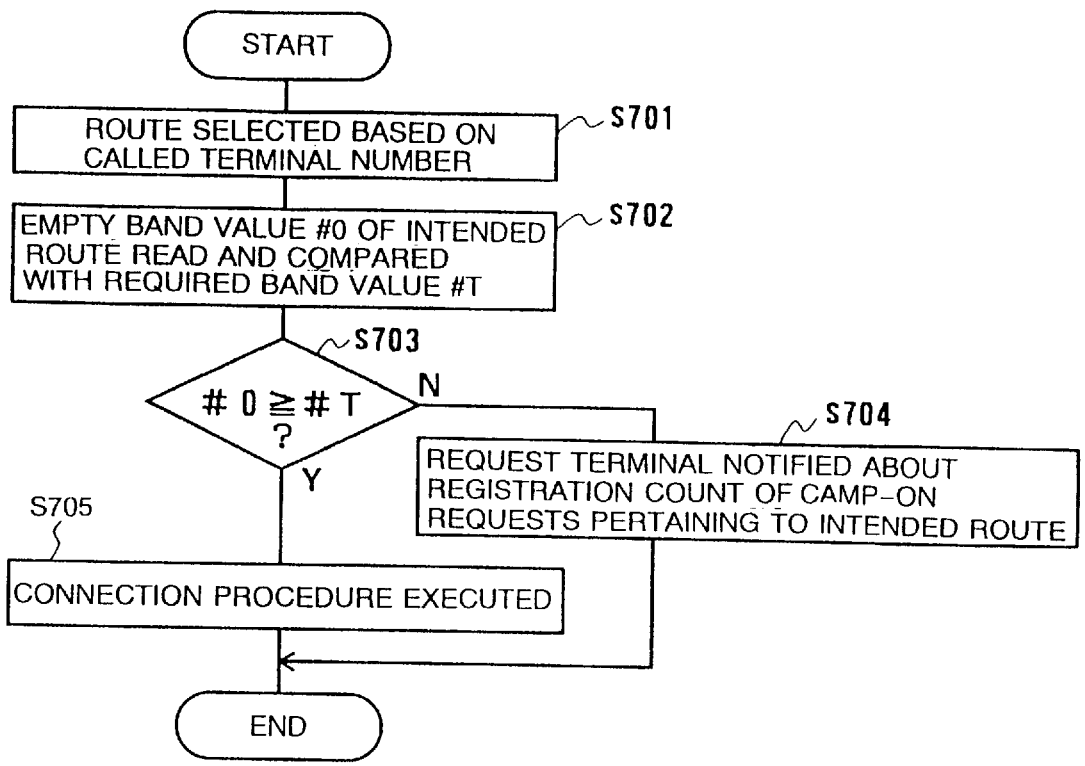
FIG. 27 is a flow chart depicting a connection request acceptance procedure performed by the ATM exchange of the fifth embodiment.

FIG. 27 depicts the processing sequence of the connection request acceptance procedure executed in the ATM exchange of the fifth embodiment. As shown in the figure, a control device 200 first specifies (step S701) the route on the basis of the called terminal number when a connection request for a call is received from a terminal. The empty band value #0 of the intended route is subsequently read from a band management table 303, and the value thereof is compared (step S702) with the required band value #T.

When the result is that the empty band value #0 exceeds the required band value #T (step S703; Y), the control device 200 executes (step S705) a connection procedure, completing the connection request acceptance procedure. When, however, the empty band value #0 is lower than the required band value #T (step S703; N), the registration count of camp-on requests pertaining to the intended route is determined by accessing the contents of the registration count management table 309, and the terminal is notified (step S704) of the registration count of the camp-on requests thus determined.

The camp-on request registration procedure and the band value updating procedure have essentially the same sequences as in the first embodiment, and a detailed discussion will therefore be omitted. In each of these procedures, the contents of the registration count management table 309 are updated when a camp-on request is registered or when permission to call has been granted with respect to a camp-on request.

Figure 28:
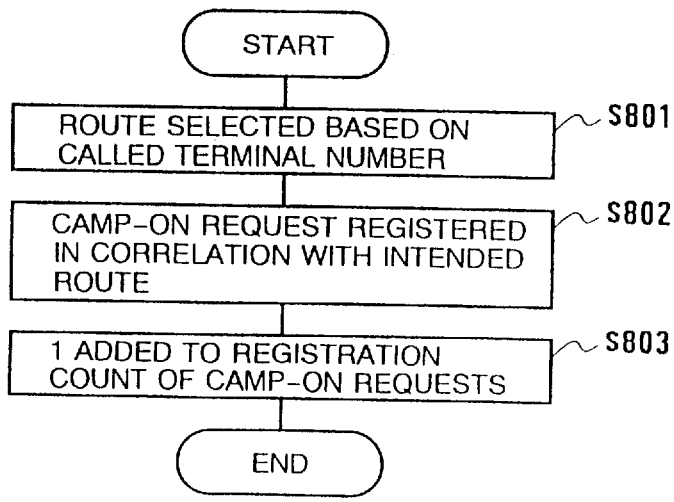
FIG. 28 is a flow chart depicting a camp-on request registration procedure performed by the ATM exchange of the fifth embodiment.

For example, during the camp-on request registration procedure, the registration of camp-on requests correlated with routes (steps S801 and S802) is followed by the execution of a procedure (step S803) for adding "1" to the registration count of the camp-on requests pertaining to these routes in the registration count management table 309, as shown in FIG. 28.

Figure 29:
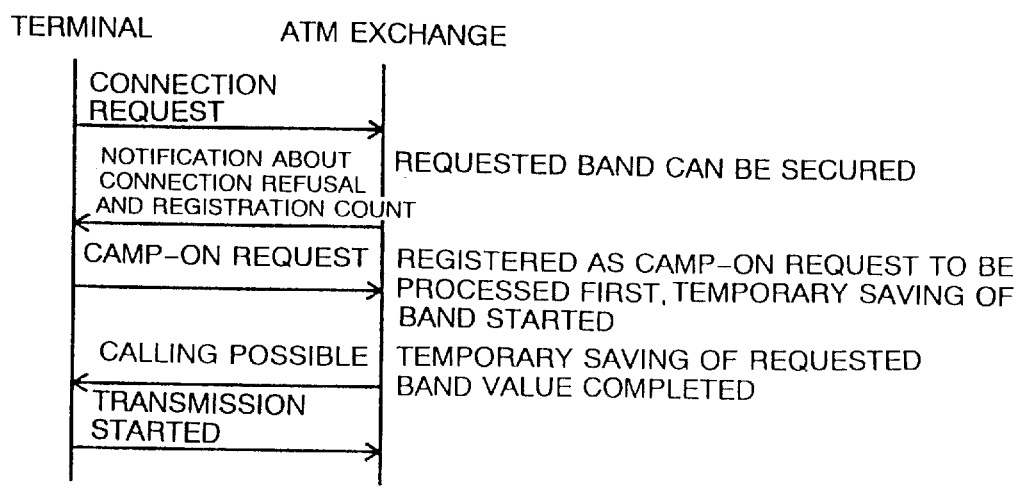
FIG. 29 is a sequence diagram for terminals and the ATM exchange of the fifth embodiment.

Specifically, when the ATM exchange of the fifth embodiment cannot accept a connection request, the terminal is notified of the registration count of camp-on requests, as schematically shown in FIG. 29. Each of the terminals connected to the ATM exchange in question can therefore determine whether or not to make a camp-on request, using the registration count of the indicated camp-on requests.

Sixth Embodiment

Figure 30:
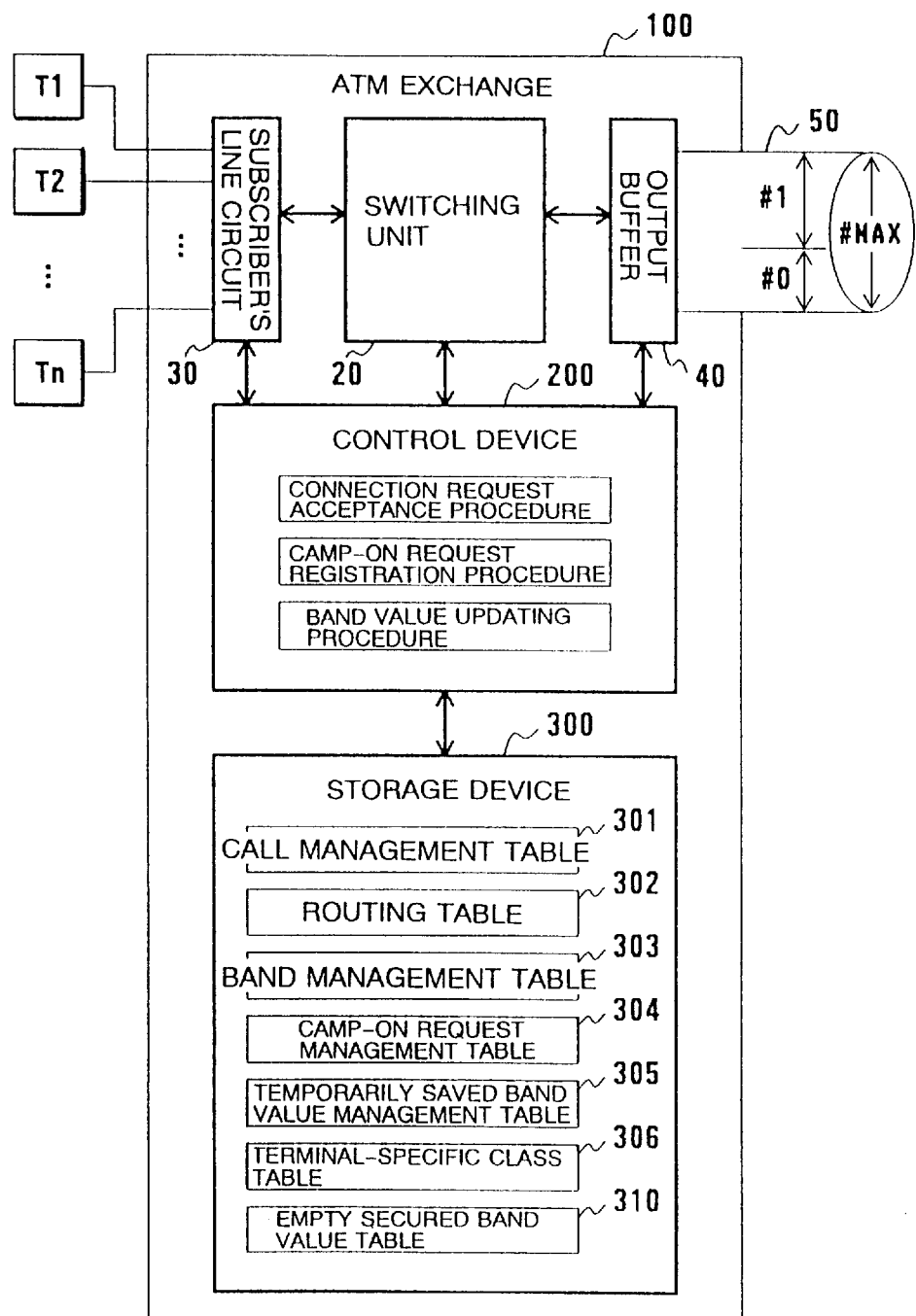
FIG. 30 is a block diagram depicting the structure of the ATM exchange pertaining to a sixth embodiment of the present invention.

FIG. 30 depicts a schematic structure of the ATM exchange pertaining to a sixth embodiment of the present invention. The ATM exchange of the sixth embodiment is based on the ATM exchange of the second embodiment, and the storage device 300 thereof further accommodates an empty secured band value table 310.

Figure 31:
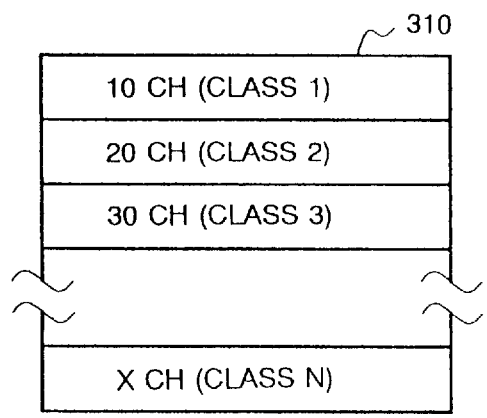
FIG. 31 is a block diagram of an empty secured band value table accommodated in the ATM exchange of the sixth embodiment.

FIG. 31 depicts the empty secured band value table 310. As shown in the figure, empty secured band values for the corresponding classes used in a terminal-specific class table 306 are stored in the empty secured band value table 310. The empty secured band values in the empty secured band value table 310 are used when it is determined whether or not a connection request or camp-on request from a terminal with a corresponding class can be accepted.

Figure 32:
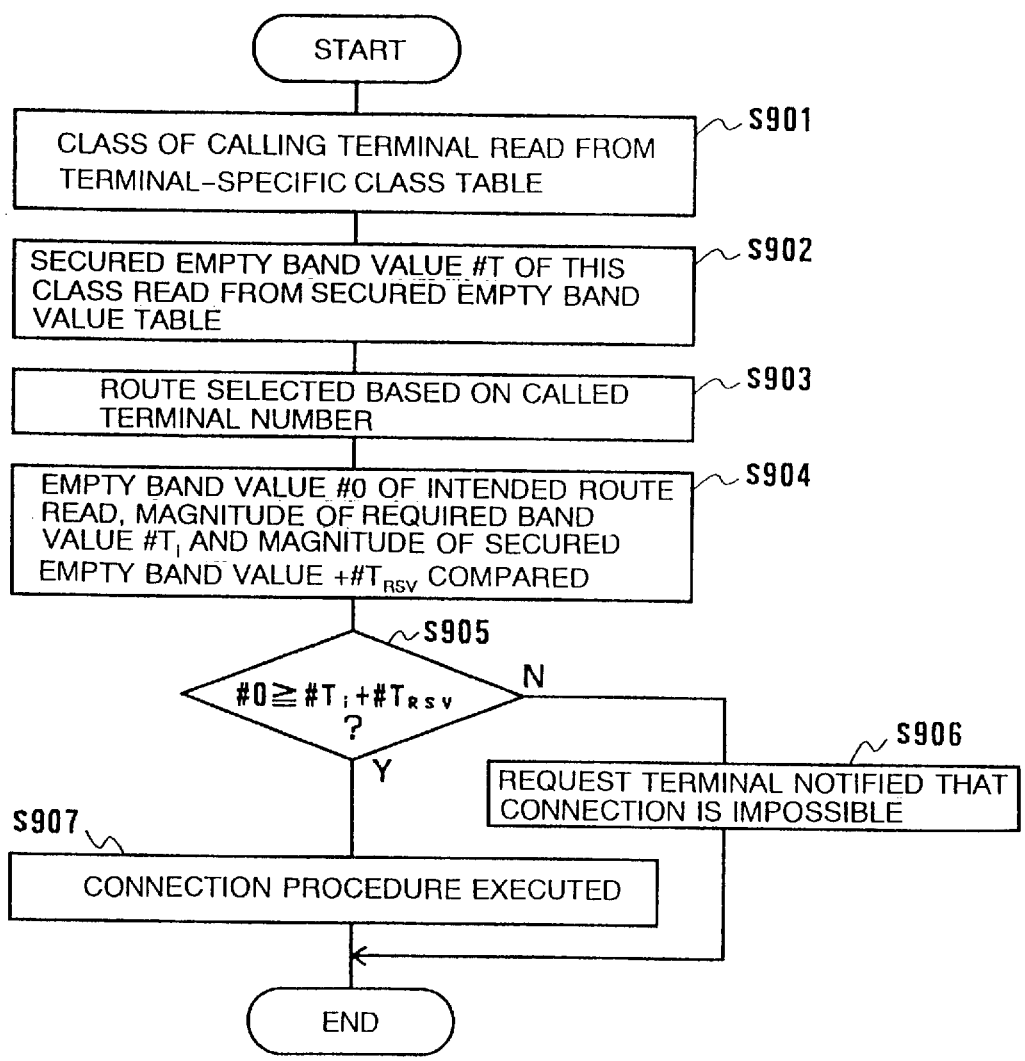
FIG. 32 is a flow chart depicting a connection request acceptance procedure performed by the ATM exchange of the sixth embodiment.

FIG. 32 depicts the processing sequence of the connection request acceptance procedure executed in the ATM exchange of the sixth embodiment. As shown in the figure, when a connection request is received from a terminal, a control device 200 first reads (step S901) the class allocated to the calling terminal from the terminal-specific class table 306, and reads (step S902) the empty secured band value $\#T_{RSV}$ pertaining to this class from the empty secured band value table 310. A route based on the called terminal number is subsequently selected (step S903). The empty band value #0 of the intended route is read from a band management table 303, and the value thereof is compared (step S904) with the sum of the required band value #T and the empty secured band value $\#T_{RSV}$.

When the result is that the empty band value #0 exceeds the sum of the required band value #T and the empty secured band value $\#T_{RSV}$ (step S905; Y), the control device 200 executes (step S907) a connection procedure, completing the connection request acceptance procedure. When, however, the empty band value #0 is lower than the sum of the required band value #T and the empty secured band value $\#T_{RSV}$ (step S905; N), the calling terminal is notified (step S906) of a refusal to connect, completing the connection request acceptance procedure.

The band value updating procedure performed by the ATM exchange of the sixth embodiment is the same as the band value updating procedure in the second embodiment. In addition, the camp-on request registration procedure performed by the ATM exchange of the sixth embodiment is virtually the same as the camp-on request registration procedure in the second embodiment. In the camp-on request registration procedure performed in the sixth embodiment, however, temporary saving is started while the empty band value is retained in an amount corresponding to the empty secured band value when the first camp-on request pertaining to a certain route has been received. Specifically, a band value obtained by reducing the corresponding empty band value by an empty secured band value is stored as the temporarily saved band value pertaining to the intended route in a temporarily saved band value management table 305, and the empty secured band value is stored as an empty band value in the band management table 303.

Thus, when a camp-on request for a certain route is made by a certain terminal in the ATM exchange of the sixth embodiment, an empty band value adjusted by the empty secured band value pertaining to the class of this terminal is secured as the empty band value pertaining to this route.

Figure 33:
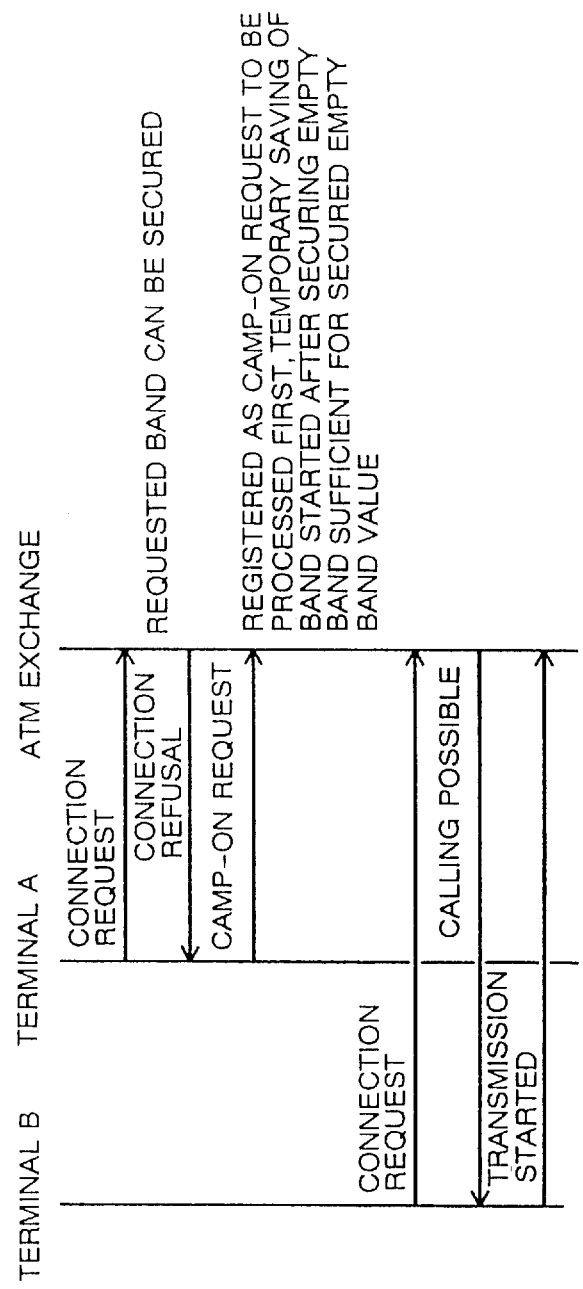
FIG. 33 is a sequence diagram for terminals and the ATM exchange of the sixth embodiment.

Therefore, even when a camp-on request from a terminal A has been registered, as schematically shown in FIG. 33, connection requests from a terminal B are sometimes accepted with respect to the same route as that for which the camp-on request has been issued. Specifically, a connection request from a terminal B is accepted and connection made when the empty secured band value pertaining to the terminal B is lower than the empty secured band value pertaining to the terminal A, and the band value necessary for the connection request made by the terminal B is lower than the difference between the two empty secured band values.

Seventh Embodiment

Figure 34:
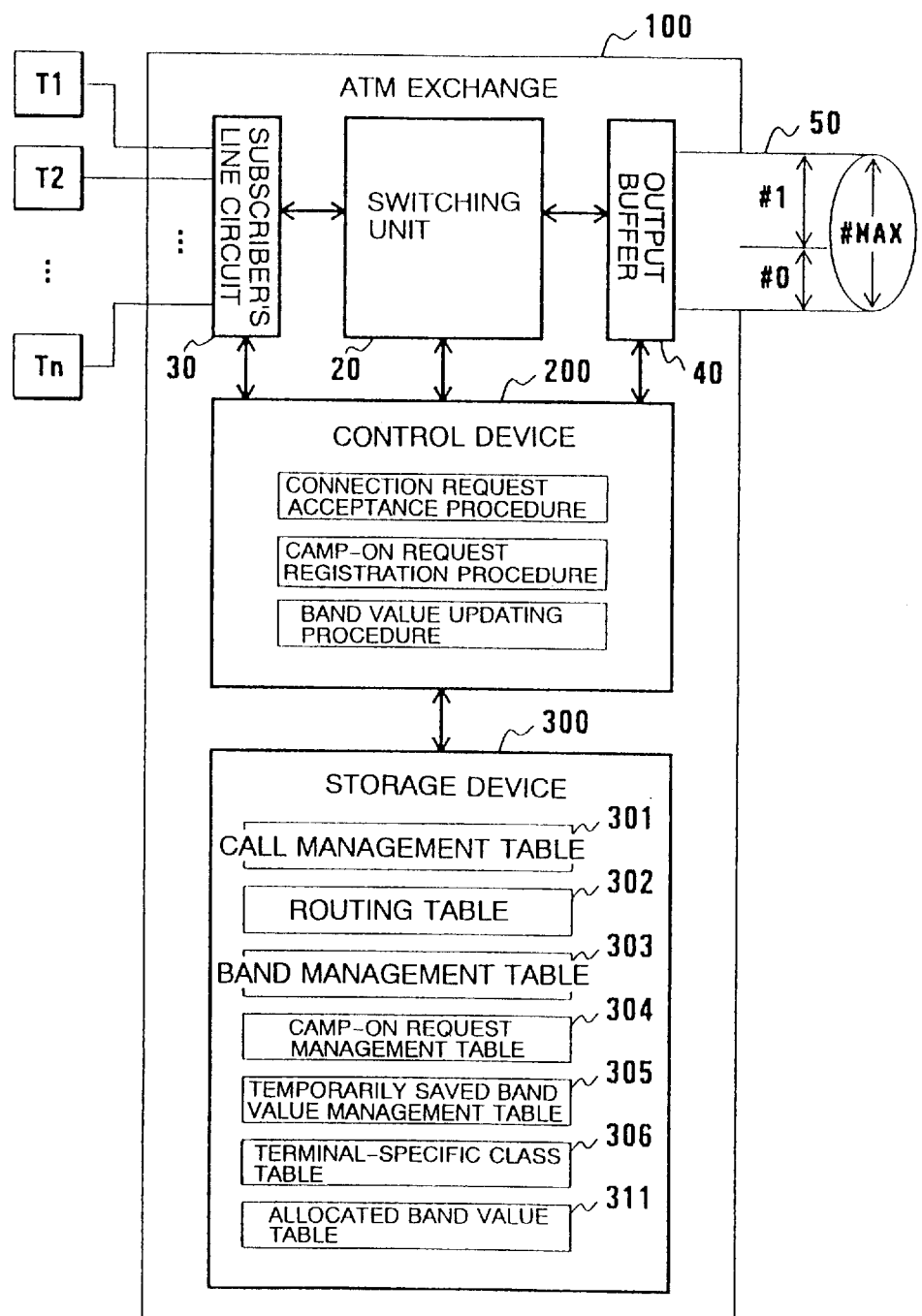
FIG. 34 is a block diagram depicting the structure of the ATM exchange pertaining to a seventh embodiment of the present invention.

FIG. 34 depicts a schematic structure of the ATM exchange pertaining to a seventh embodiment of the present invention. The ATM exchange of the seventh embodiment is based on the ATM exchange of the second embodiment, and the storage device 300 thereof further accommodates an allocated band value table 311.

Figure 35:
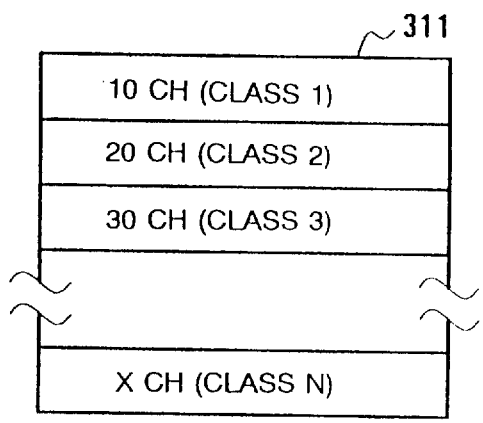
FIG. 35 is a block diagram of an allocated band value table accommodated in the ATM exchange of the seventh embodiment.

FIG. 35 depicts the structure of the allocated band value table 311. As shown in the figure, allocated band values for the corresponding classes used in a terminal-specific class table 306 are stored in the allocated band value table 311.

Figure 36:
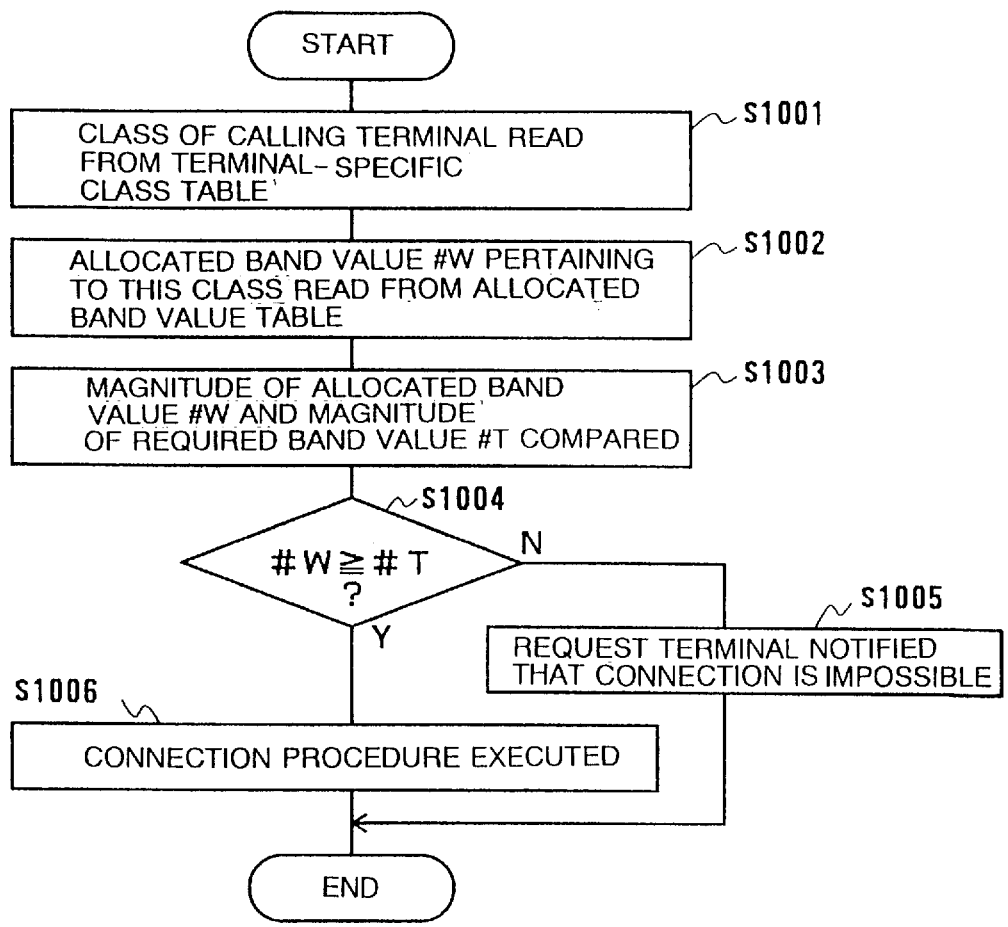
FIG. 36 is a flow chart depicting a connection request acceptance procedure performed by the ATM exchange of the seventh embodiment.

FIG. 36 depicts the processing sequence of the connection request acceptance procedure executed in the ATM exchange of the seventh embodiment. As shown in the figure, when a connection request is received from a terminal, a control device 200 first reads (step S1001) the class allocated to the calling terminal from the terminal-specific class table 306, and reads (step S1002) the allocated band value #W pertaining to this class from the allocated band value table 311. A route based on the called terminal number is subsequently selected (step S1003). The magnitude of the allocated band value #W and the magnitude of the required band value #T are subsequently compared with each other (step S1003), and when the allocated band value #W is higher than the required band value #T (step S1004; Y), a connection procedure is executed (step S1005), completing the connection request acceptance procedure. When the allocated band value #W is lower than the required band value #T (step S1005; N), the calling terminal is notified (step S1006) that connection is impossible, completing the connection request acceptance procedure.

The band value updating procedure performed by the ATM exchange of the seventh embodiment is the same as the band value updating procedure in the second embodiment. In addition, the camp-on request registration procedure performed by the ATM exchange of the seventh embodiment is virtually the same as the camp-on request registration procedure in the second embodiment. In the camp-on request registration procedure performed in the seventh embodiment, however, the magnitude of the allocated band value #W and the magnitude of the required band value #T are compared with each other when a camp-on request has been received, and a message is given that the camp-on request cannot be registered when the allocated band value #W is lower than the required band value #T.

Figure 37:
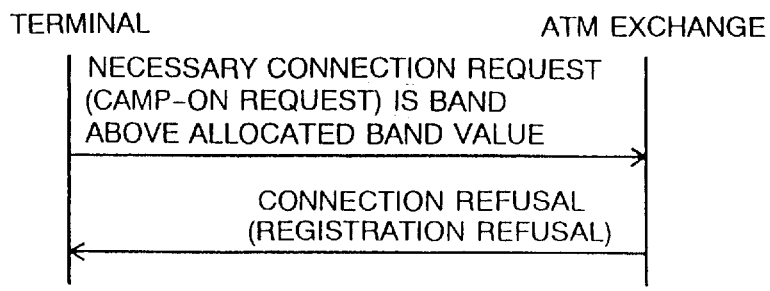
FIG. 37 is a sequence diagram for terminals and the ATM exchange of the seventh embodiment.

Specifically, a terminal having a certain class is notified of a refusal to connect or register when this terminal makes a connection request or a camp-on request requiring a band that exceeds the allocated band value pertaining to this class in the ATM exchange of the seventh embodiment, as schematically shown in FIG. 37.

Eighth Embodiment

Figure 38:
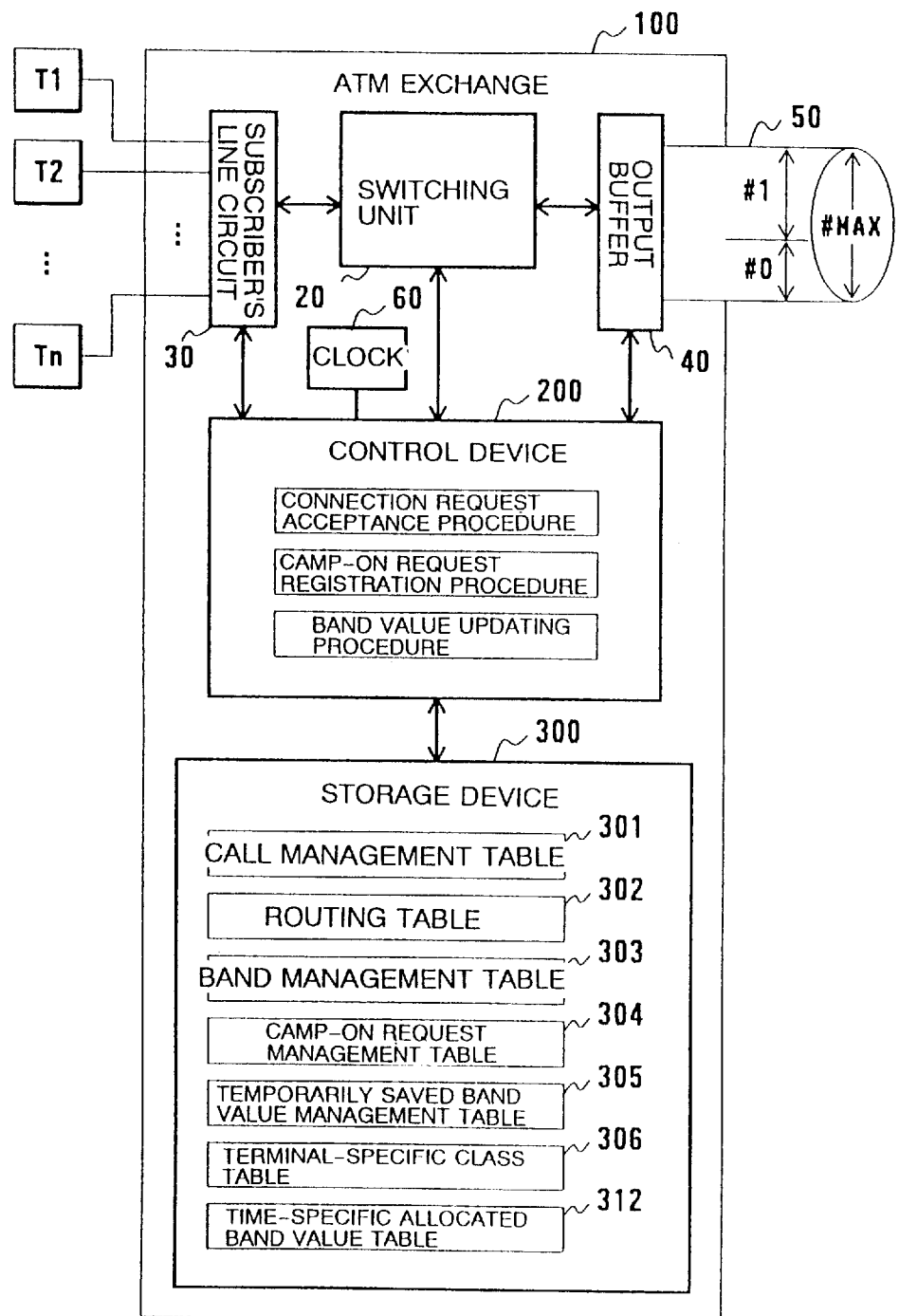
FIG. 38 is a block diagram depicting the structure of the ATM exchange pertaining to an eighth embodiment of the present invention.

FIG. 38 depicts a schematic structure of the ATM exchange of an eighth embodiment of the present invention. The ATM exchange of the eighth embodiment is based on the ATM exchange of the seventh embodiment; a time-specific allocated band value table 312 is stored instead of the allocated band value table 311 in the storage device 300 thereof. The ATM exchange 100 also has a clock 60 for outputting the current time.

Figure 39:
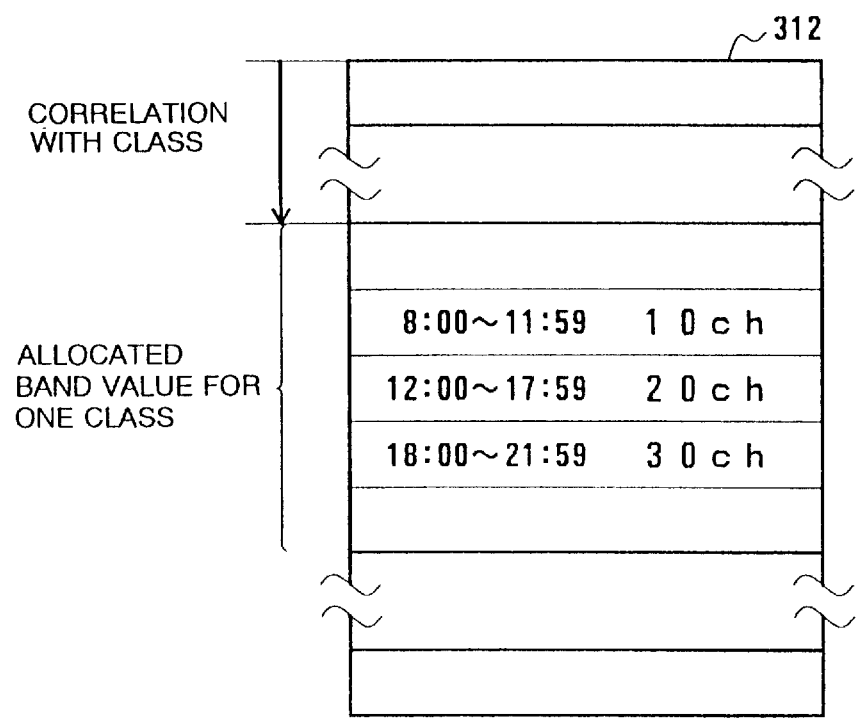
FIG. 39 is a block diagram of a time-specific allocated band value table accommodated in the ATM exchange of the eighth embodiment.

FIG. 39 shows the structure of the time-specific allocated band value table. As shown in the figure, the time-specific allocated band value table 312 classifies by the time period and stores allocated band values with respect to the corresponding classes used in the terminal-specific class table 306.

Figure 40:
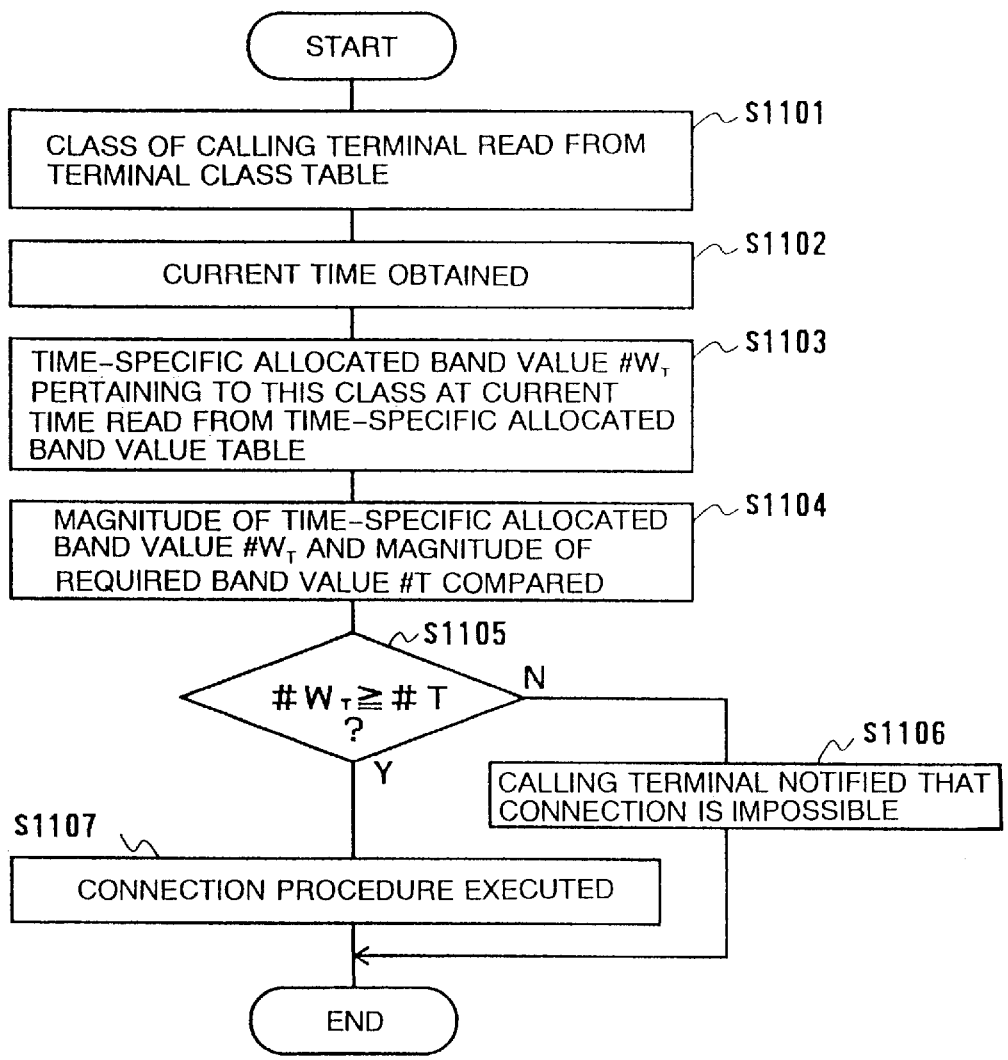
FIG. 40 is a flow chart depicting a connection request acceptance procedure performed by the ATM exchange of the eighth embodiment.

FIG. 40 depicts the processing sequence of the connection request acceptance procedure executed in the ATM exchange of the eighth embodiment. As shown in the figure, when a connection request is received from a terminal, a control device 200 first reads (step S1101) the class allocated to the calling terminal from the terminal-specific class table 306. In addition, the current time is obtained (step S1102) from the clock 60, and the allocated band value $\#W_T$ that exists at the current time and that pertains to this class is read (step S1103) from the time-specific allocated band value table 312. The magnitude of the allocated band value $\#W_T$ and the magnitude of the required band value #T are subsequently compared with each other (step S1104), and when the allocated band value $\#W_T$ is higher than the required band value #T (step S1105; Y), a connection procedure is executed (step S1107), completing the connection request acceptance procedure. When the allocated band value $\#W_T$ is lower than the required band value #T (step S1105; N), the calling terminal is notified (step S1106) that connection is impossible, completing the connection request acceptance procedure.

In the camp-on request registration procedure performed in the eighth embodiment, the magnitude of the allocated band value $\#W_T$ and the magnitude of the required band value #T are compared with each other when a camp-on request has been received, and a message is given that the camp-on request cannot be registered when the allocated band value $\#W_T$ is lower than the required band value #T.

Figure 41:
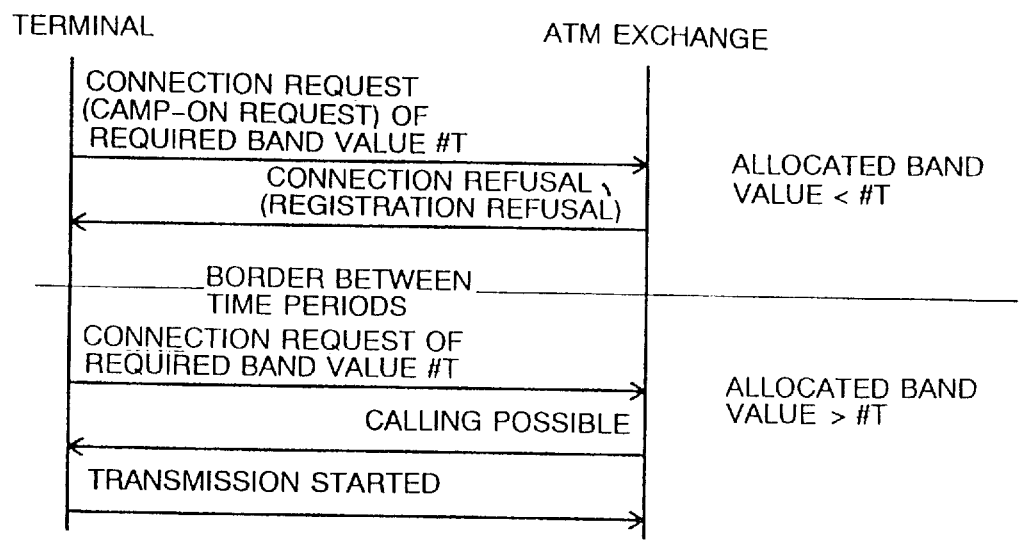
FIG. 41 is a sequence diagram for terminals and the ATM exchange of the eighth embodiment.

Specifically, when, as schematically shown in FIG. 41, a connection request or a camp-on request has been received from a terminal having a certain class in the ATM exchange of the eighth embodiment, it is determined that the connection request cannot be accepted or the camp-on request registered, depending on the time period in which this request has been issued.

Ninth Embodiment

Figure 42:
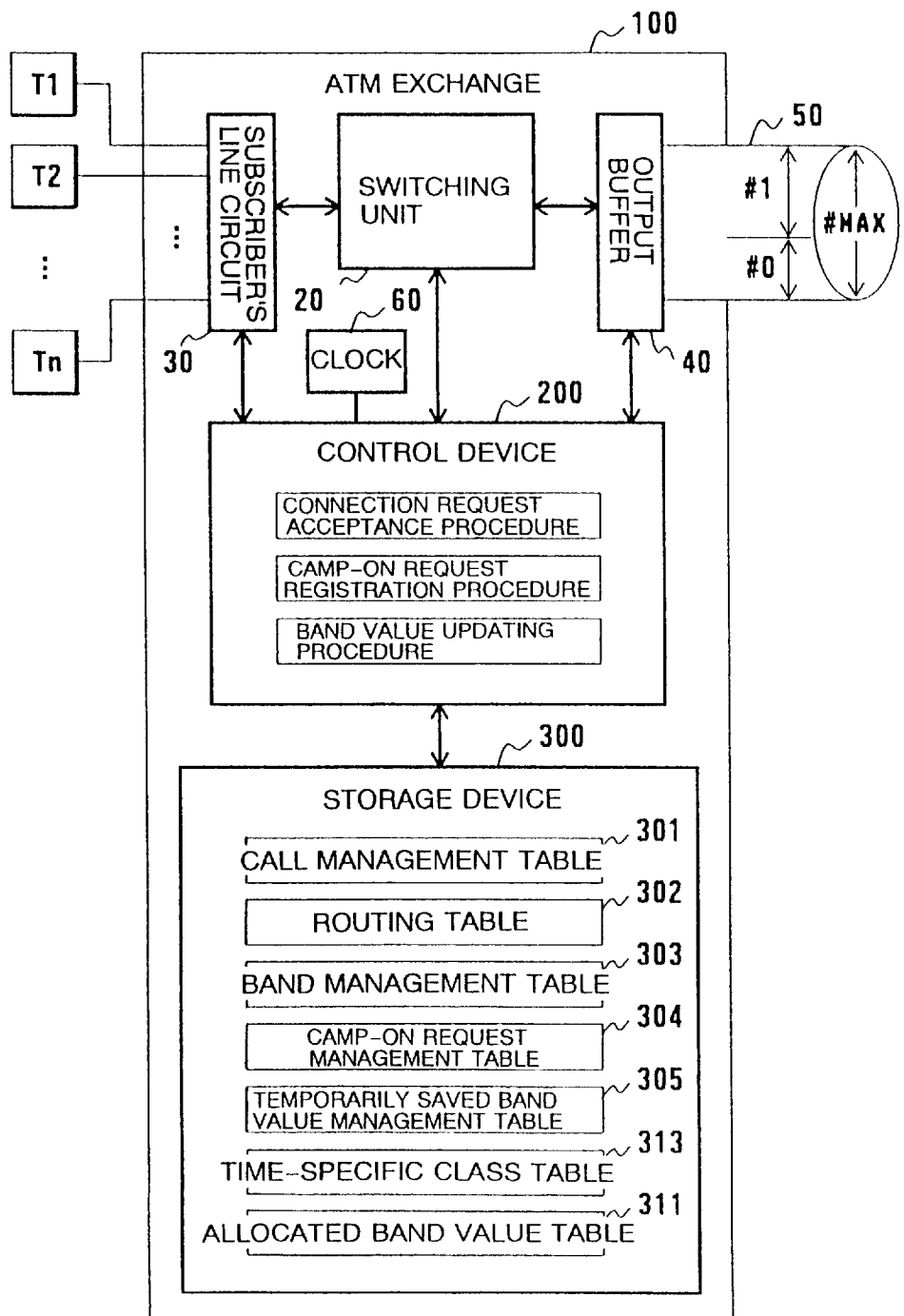
FIG. 42 is a block diagram depicting the structure of the ATM exchange pertaining to a ninth embodiment of the present invention.

FIG. 42 depicts a schematic structure of the ATM exchange pertaining to a ninth embodiment of the present invention. The ATM exchange of the ninth embodiment is based on the ATM exchange of the eighth embodiment, and a time-specific class table 313 and an allocated band value table 311 (FIG. 35) are stored in the storage device 300 thereof instead of the terminal-specific class table 306 and the time-specific allocated band value table 312.

Figure 43:
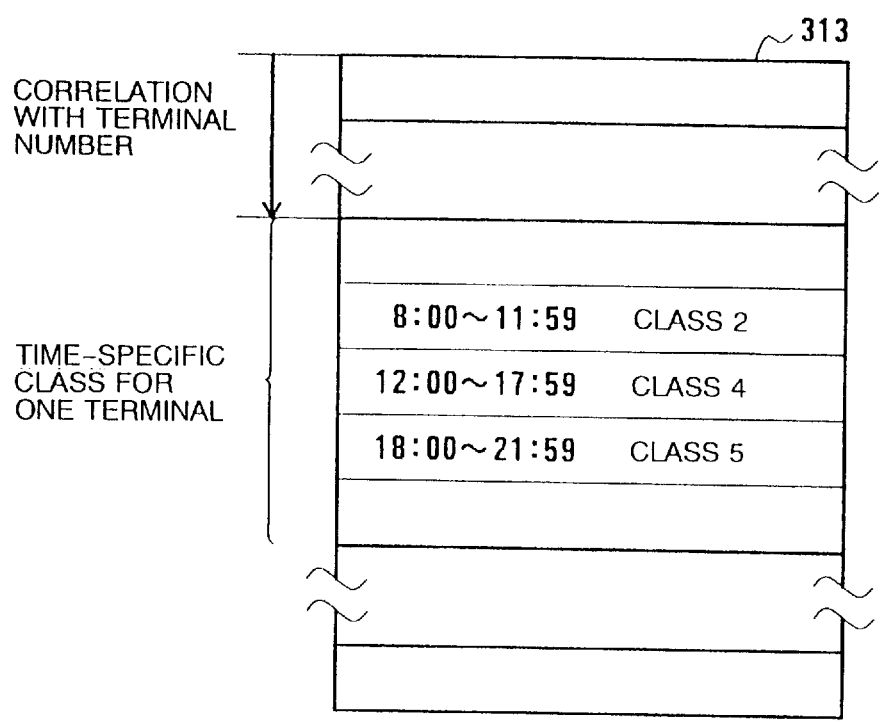
FIG. 43 is a block diagram of a time-specific allocated class table accommodated in the ATM exchange of the ninth embodiment.

FIG. 43 depicts the structure of the time-specific class table 313. As shown in the figure, terminal classes are stored for different periods of time in the time-specific class table 313.

Figure 44:
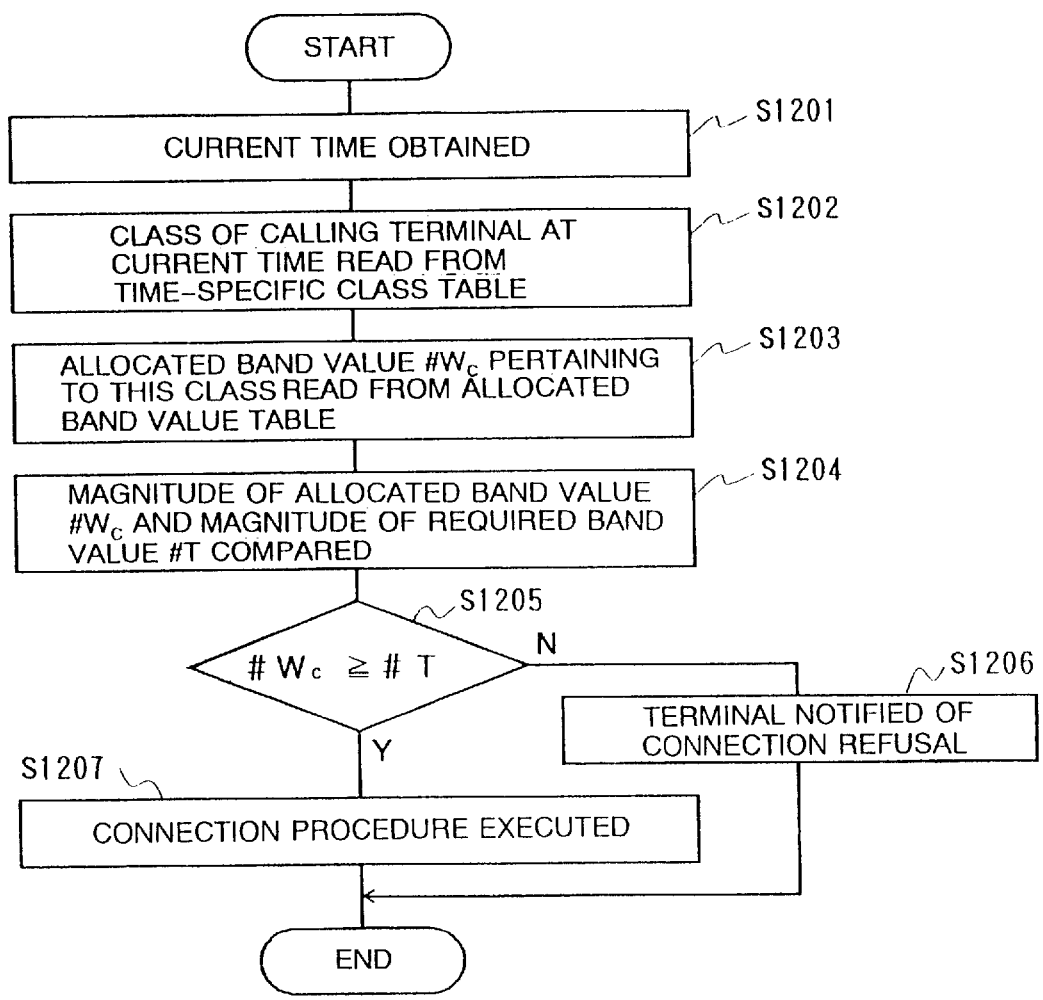
FIG. 44 is a flow chart depicting a connection request acceptance procedure performed by the ATM exchange of the ninth embodiment.

FIG. 44 depicts the processing sequence of the connection request acceptance procedure executed in the ATM exchange of the ninth embodiment. As shown in the figure, a control device 200 first obtains (step S1201) the current time from a clock 60 when a connection request has been received from a terminal. The class pertaining to the calling terminal at the current time is subsequently read (step S1202) from the time-specific class table 313. In addition, the allocated band value $\#W_C$ pertaining to this class is read (step S1203) from the allocated band value table 311.

The magnitude of the allocated band value $\#W_C$ that has been read and the magnitude of a required band value #T are subsequently compared with each other (step S1204), and when the allocated band value $\#W_C$ is higher than the required band value #T (step S1205; Y), a connection procedure is executed (step S1207), completing the connection request acceptance procedure. When the allocated band value $\#W_C$ is lower than the required band value #T (step S1205; N), the calling terminal is notified (step S1206) that connection is impossible, completing the connection request acceptance procedure.

In the camp-on request registration procedure performed in the ninth embodiment, an allocated band value $\#W_C$ is selected as a result of the same procedure when a camp-on request is received, and the request terminal is notified that the camp-on request cannot be registered when the allocated band value $\#W_C$ is lower than the required band value #T. When the allocated band value $\#W_C$ is higher than the required band value #T, a registration position is established for the camp-on request using the class that has been read in the process of selecting the allocated band value $\#W_C$.

Thus, in the ATM exchange of the ninth embodiment, classes are allocated to terminals for each time period, and the registration ranks of camp-on requests are established using these classes. This allows camp-on requests from the terminals to be handled efficiently.

Figure 45:
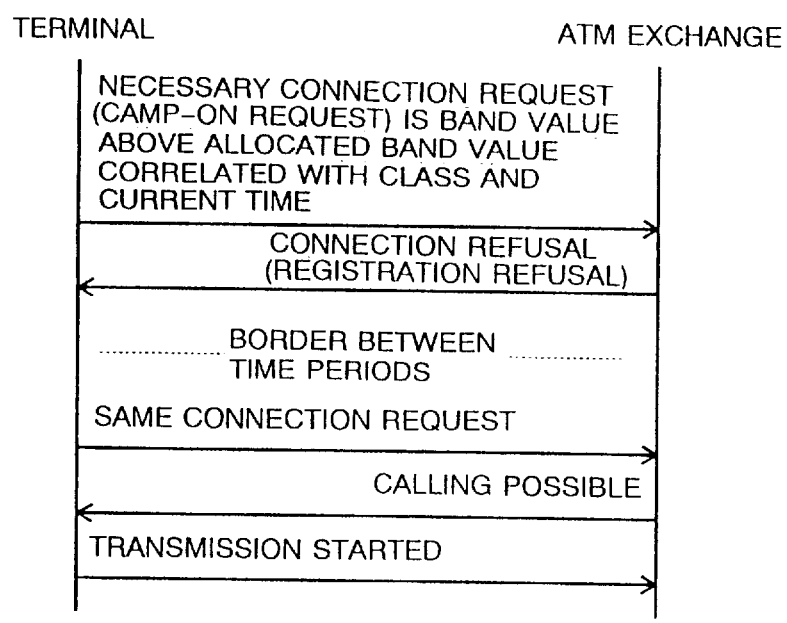
FIG. 45 is a sequence diagram for terminals and the ATM exchange of the ninth embodiment.

In addition, when, as schematically shown in FIG. 45, a connection request or a camp-on request has been received from a certain terminal in the ATM exchange of the ninth embodiment, it is determined that the connection request cannot be accepted or the camp-on request registered, depending on the time period in which this request has been issued.

Tenth Embodiment

Figure 46:
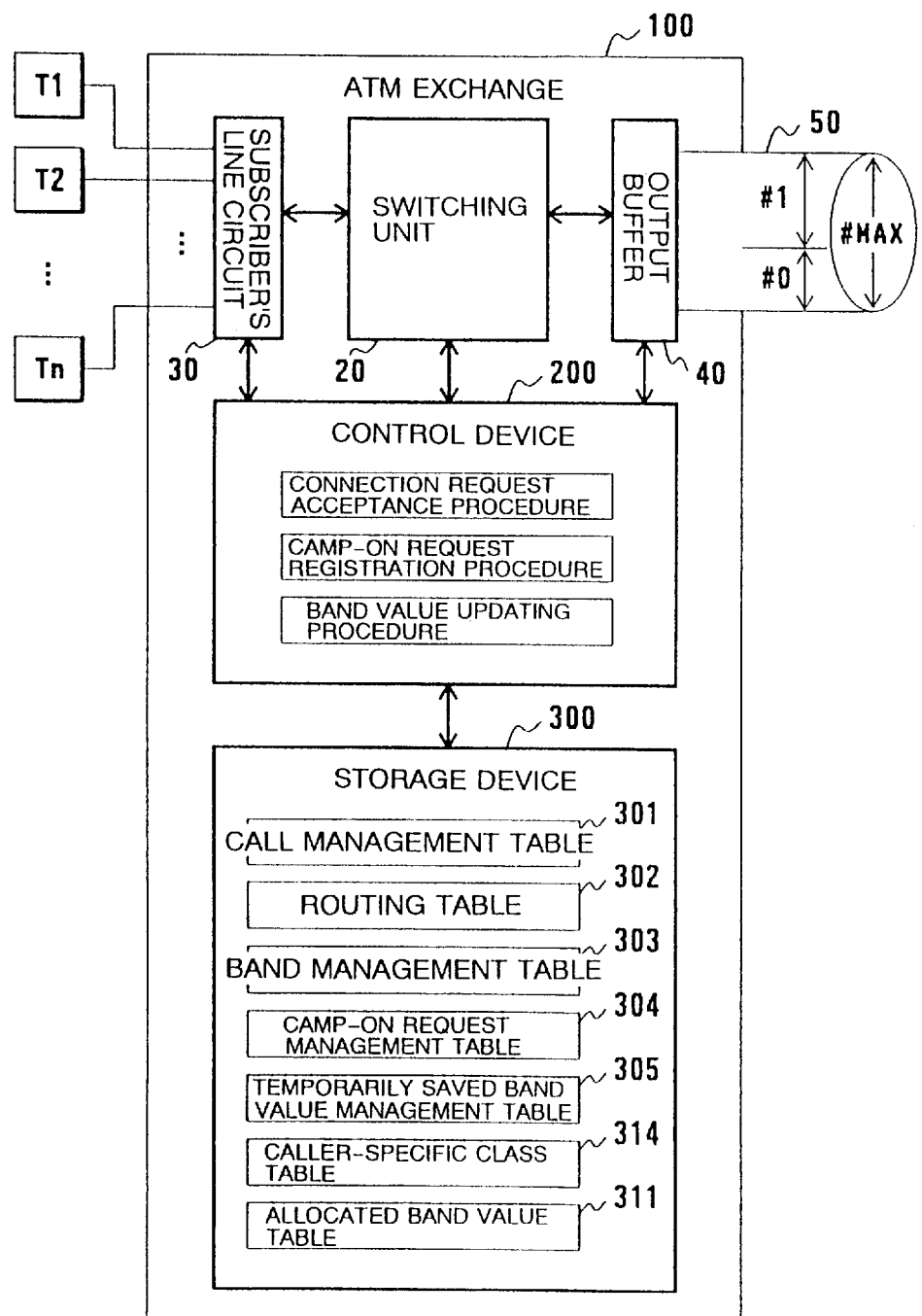
FIG. 46 is a block diagram depicting the structure of the ATM exchange pertaining to a tenth embodiment of the present invention.

FIG. 46 depicts a schematic structure of the ATM exchange pertaining to a tenth embodiment of the present invention. The ATM exchange of the tenth embodiment is a modification of the ATM exchange of the seventh embodiment, and a caller-specific class table 314 is stored in the storage device 300 instead of the terminal-specific class table 306.

Figure 47:
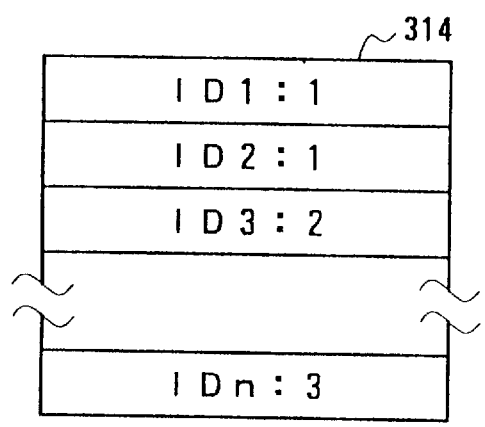
FIG. 47 is a block diagram of an ID-specific allocated class table accommodated in the ATM exchange of the tenth embodiment.

FIG. 47 depicts the structure of the caller-specific class table 314. As shown in the figure, classes assigned to callers are stored in the caller-specific class table 314 in correlation with the identifying information (ID) of each caller (terminal user).

The ATM exchange of the tenth embodiment operates upon receipt of an ID-containing connection request or camp-on request.

Figure 48:
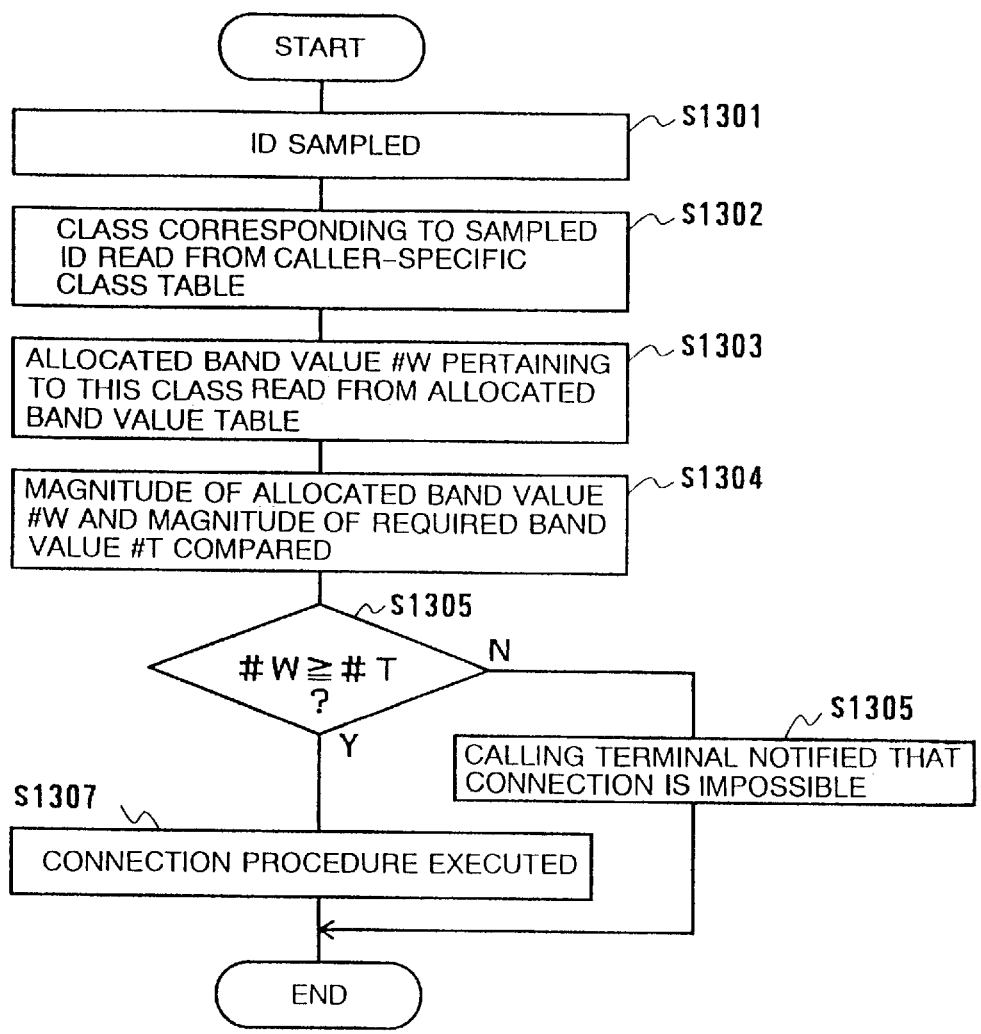
FIG. 48 is a flow chart depicting a connection request acceptance procedure performed by the ATM exchange of the tenth embodiment.

FIG. 48 depicts the processing sequence of the connection request acceptance procedure executed in the ATM exchange of the tenth embodiment. As shown in the figure, when a connection request is received, a control device 200 first samples (step S1301) from the connection request. The class associated with the sampled ID is then read (step S1302) from the caller-specific class table 314. The allocated band value #W pertaining to this class is subsequently read (step S1303) from the allocated band value table 311, and the magnitude of the allocated band value #W and the magnitude of the required band value #T are subsequently compared with each other (step S1304).

When the allocated band value #W is higher than the required band value #T (step S1305; Y), a connection procedure is executed (step S1307), completing the connection request acceptance procedure. When the allocated band value #W is lower than the required band value #T (step S1305; N), the request terminal is notified (step S1306) that connection is impossible, completing the connection request acceptance procedure.

In the camp-on request registration procedure performed in the tenth embodiment, an allocated band value #W is selected as a result of the same procedure when a camp-on request is received, and the request terminal is notified that the camp-on request cannot be registered when the allocated band value #W is lower than the required band value #T. When the allocated band value #W is higher than the required band value #T, a registration position is established for the camp-on request using the class that has been read in the process of selecting the allocated band value #W.

Thus, in the ATM exchange of the tenth embodiment, the registration ranks of camp-on requests are established using classes allocated to callers.

Figure 49:
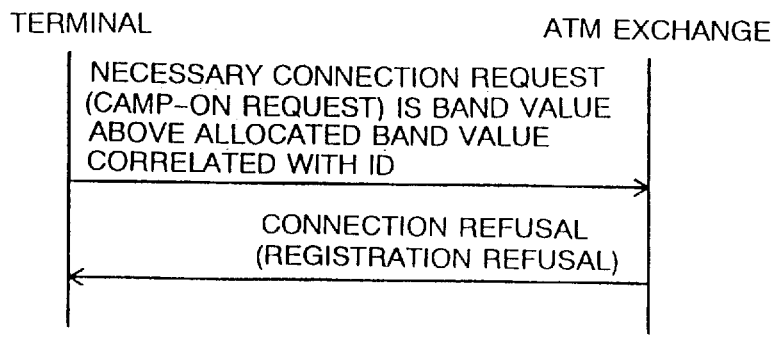
FIG. 49 is a sequence diagram for terminals and the ATM exchange of the tenth embodiment.
Figure 50:
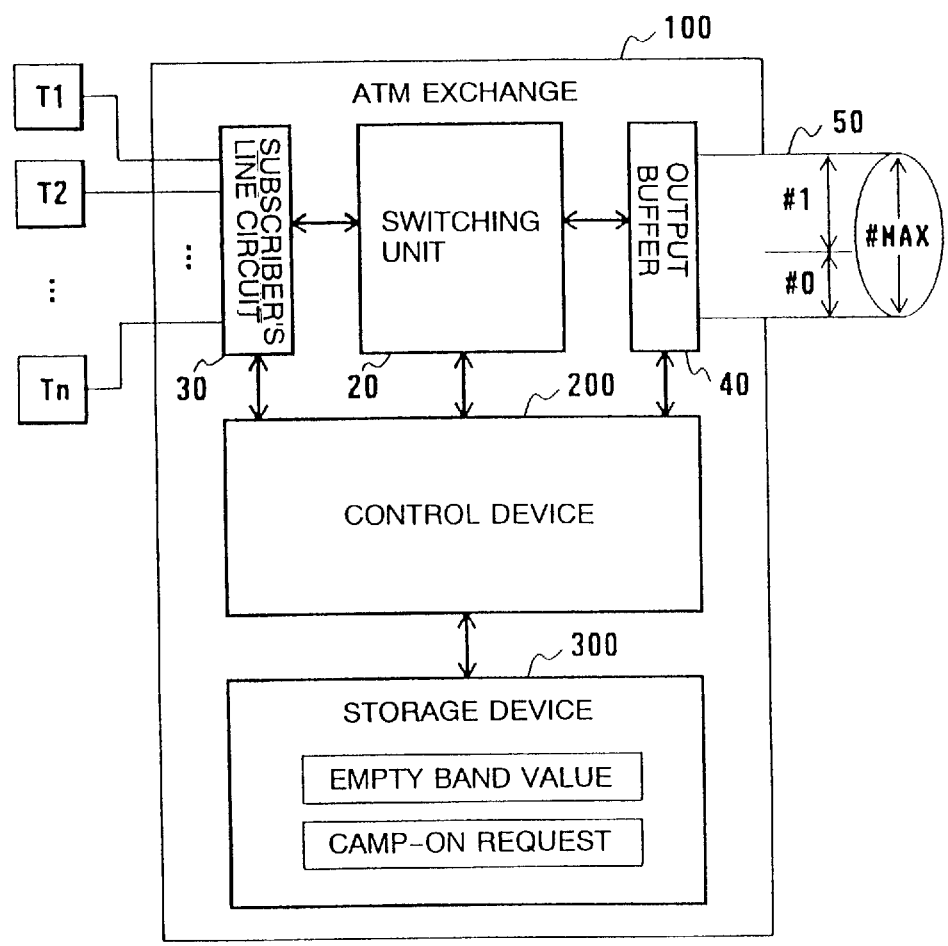
FIG. 50 is a block diagram depicting the structure of a conventional ATM exchange.

In addition, when, as schematically shown in FIG. 49, a connection request or a camp-on request that requires a band higher than the allocated band value pertaining to a certain class has been received from a terminal that has been assigned this class in the ATM exchange of the tenth embodiment, this terminal is notified of a refusal to connect or register.

Modified Embodiments

The ATM exchange of each embodiment can be modified in a variety of ways. For example, providing a time-specific class table instead of the terminal-specific class table of the ATM exchange of the second embodiment should allocate classes to different terminals in accordance with periods of time, and establish the registration ranks of camp-on requests on the basis of the classes associated with these periods of time. It is also possible to establish the registration ranks of camp-on requests in accordance with the callers by providing a caller-specific class table instead of the terminal-specific class table of the ATM exchange of the second embodiment.

Another alternative is to use one table to control both the empty band values and the temporarily saved band values instead of using a band management table and a temporarily saved band value management table.

What is claimed is:

1. An ATM exchange for receiving from terminals call connection requests and camp-on requests in which band values being used are specified, and establishing on a transmission line calls for which the specified band values can be used, wherein the ATM exchange comprises:

band value storage means for dividing unused band value of the transmission line into an empty band value and a temporarily saved band value, and storing them;

camp-on request storage means for storing the contents of camp-on requests issued by each terminal, in correlation with the processing rank of these contents;

connection request response means for establishing on the transmission line the call requested by a connection request when the connection request received from a terminal is one for which the use of a band value below the empty band value stored in the band value storage means has been specified, and notifying the terminal of a refusal to connect when the connection request is such that the use of a band value exceeding the empty band value has been specified;

camp-on request registration means for establishing, upon receipt of a camp-on request from a terminal, the processing rank of this camp-on request and performing registration in the camp-on request storage means in correlation with the processing rank that identifies the camp-on request data that represent the contents of this camp-on request;

band value setting means for adding the empty band value stored in the band value storage means to the temporarily saved band value stored in the band value storage means, and setting zero for the empty band value in the band value storage means, when the registration of camp-on request data by the camp-on request registration means is performed with respect to a camp-on request storage means in which no camp-on request data have been registered;

band value updating means for adding a band value released by a disconnected call to a temporarily saved band value stored in the band value storage means when camp-on request data have been registered in the camp-on request storage means upon detection of the disconnected call in the transmission line, and adding the band value released by the disconnected call to the empty band value stored in the band value storage means when no camp-on request data have been registered in the camp-on request storage means;

camp-on request response means for establishing a call that corresponds to camp-on request data in the transmission line when the temporarily saved band value stored in the band value storage means exceeds the band value specified for use by the camp-on request data that are stored in the camp-on request storage means and that are assigned the highest processing rank; and post-processing means for reducing the temporarily saved band value stored in the band value storage means by the band value used to set up a call when it is set up by the camp-on request response means, and erasing the camp-on request data that is stored in the camp-on request storage means and that have been used by the camp-on request response means.

2. An ATM exchange as defined in claim 1, wherein the camp-on request registration means assigns a processing rank such that when camp-on request data concerning a newly received camp-on request are registered, these camp-on request data are processed following the processing of the camp-on request data registered in the camp-on request data storage means.

3. An ATM exchange as defined in claim 1, further comprising class storage means for storing classes assigned to different terminals, wherein the camp-on request registration means is such that when camp-on request data concerning a new camp-on request received from a terminal are stored in the camp-on request storage means, the processing rank of each piece of the camp-on request data stored in the camp-on request storage means is changed in such a way that these camp-on request data are processed in an order correlated with the classes that are assigned to these terminals and that are stored in the class storage means.

4. An ATM exchange as defined in claim 3, further comprising:

second class storage means for storing a second type of class data and waiting time data concerning each terminal;

selection means for selecting, from among the camp-on request data stored in the camp-on request storage means, camp-on request data in which the time that has elapsed following registration exceeds the waiting time data stored in the second class storage means for a terminal that has issued a camp-on request; and second processing rank change means for changing the processing rank of each peace of the camp-on request data stored in the camp-on request storage means in such a way that the camp-on request data selected by the selection means are processed in accordance with an order that corresponds to the second class stored in the second class storage means for the terminal that has issued this camp-on request.

5. An ATM exchange as defined in claim 3, further comprising class-specific allocated band value storage means for storing interrelations between classes and allocated band values, wherein the connection request response means is such that even in cases in which a connection request that requires the use of a band value below the empty band value in the band value storage means has been received from a terminal, a message is given that connection is refused when this band value is higher than the allocated band value stored in the class-specific allocated band value storage means for this terminal class; and the camp-on request registration means is such that a terminal is notified of a refusal to register a camp-on request when the band value specified for use with the camp-on request received from the terminal is higher than the allocated band value stored in the class-specific allocated band value storage means for this terminal class.

6. An ATM exchange as defined in claim 3, further comprising class-specific secured empty band value storage means for storing interrelations between classes and secured empty band values, wherein the connection request response means establishes a requested call on the transmission line only in those cases in which the value stored in the band value storage means when a call connection has been requested by a terminal is the empty band values that exceed the value obtained by adding the requested band value and the secured empty band value stored in the class-specific secured empty band value means for this terminal; and the camp-on request registration means adds the secured empty band value stored in the class-specific secured empty band value means for the terminal that has issued a camp-on request to the temporarily saved band value in the band value storage means, and subtracts this secured empty band value from the empty band value in the band value storage means, when a camp-on request has been received in the absence of a monitoring object.

7. An ATM exchange as defined in claim 1, further comprising a time-specific class storage means for storing classes related to different terminals for each time period, wherein the camp-on request registration means is such that when camp-on request data concerning a new camp-on request received from a terminal are registered in the camp-on request storage means, the processing rank of each piece of the camp-on request data stored in the camp-on request storage means is changed in such a way that these camp-on request data are processed in an order correlated with the classes that are assigned to these terminals and that are stored in the class storage means at the present time.

8. An ATM exchange as defined in claim 1, further comprising allocated band value storage means for storing interrelations between terminals and allocated band values, wherein the connection request response means is such that even in cases in which a connection request that requires the use of a band value below the empty band value in the band value storage means has been received from a terminal, a message is given that connection is refused when this band value is higher than the allocated band value stored in the allocated band value storage means for this terminal; and the camp-on request registration means is such that a terminal is notified of a refusal to register a camp-on request when the band value specified for use with the camp-on request received from the terminal is higher than the allocated band value stored in the allocated band value storage means for this terminal.

9. An ATM exchange as defined in claim 1, further comprising secured empty band value storage means for storing interrelations between terminals and secured empty band values, wherein the connection request response means establishes a requested call on the transmission line only in those cases in which the value stored in the band value storage means when a call connection has been requested by a terminal is the empty band value that exceed the value obtained by adding the requested band value and the secured empty band value stored in the secured empty band value means for this terminal; and the camp-on request registration means adds the secured empty band value stored in the secured empty band value means for the terminal that has issued a camp-on request to the temporarily saved band value in the band value storage means, and subtracts this secured empty band value from the empty band value in the band value storage means, when a camp-on request has been received in the absence of an object of monitoring (camp-on request).

10. An ATM exchange as defined in claim 1, further comprising caller-specific class storage means for storing interrelations between classes and caller identification information, wherein the camp-on request registration means changes the processing rank of each piece of the camp-on request data stored in the camp-on request storage means in such a way that the camp-on request received is processed in an order corresponding to the classes that are stored in the caller-specific class storage means and that are correlated with the identification information contained in the camp-on request.

11. An ATM exchange as defined in claim 1, wherein the connection request response means gives a message about the number of pieces of the camp-on request data registered in the camp-on request storage means when a terminal is notified of a connection refusal.

12. An ATM exchange for receiving from terminals connection requests in which the band value being used are specified, and establishing on a transmission line calls for which the specified band value can be used, wherein the ATM exchange comprises:

band value storage means for dividing unused band value of the transmission line into an empty band values and a temporarily saved band values, and storing them;

camp-on request storage means for storing the contents of camp-on requests in correlation with the processing rank thereof;

connection request processing means for establishing on the transmission line the call requested by a connection request when the connection request received from a terminal is one for which the use of a band value below the empty band value stored in the band value storage means has been specified, considering the connection request to be a camp-on request when the connection request is one for which the use of a band value above the empty band value has been specified, and performing registration in the camp-on request storage means in correlation with the processing rank that identifies the camp-on request data that represent the contents of this camp-on request;

band value setting means for adding the empty band value stored in the band value storage means to the temporarily saved band value stored in the band value storage means, and setting zero for the empty band value in the band value storage means, when the registration of camp-on request data by the connection request processing means is performed with respect to a camp-on request storage means in which no camp-on request data have been registered;

band value updating means for adding a band value released by a disconnected call to a temporarily saved band value stored in the band value storage means when camp-on request data have been registered in the camp-on request storage means upon detection of the disconnected call in the transmission line, and adding the band value released by the disconnected call to an empty band value stored in the band value storage means when no camp-on request data have been registered in the camp-on request storage means;

camp-on request response means for establishing a call that corresponds to camp-on request data in the transmission line when the temporarily saved band value stored in the band value storage means exceeds the band value specified for use by the camp-on request data that are stored in the camp-on request storage means and that are assigned the highest processing rank; and post-processing means for reducing the temporarily saved band value stored in the band value storage means by the band value used to set up a call when it is set up by the camp-on request response means, and erasing the camp-on request data that is stored in the camp-on request storage means and that have been used by the camp-on request response means.

* * * * *